US012705504B2

(12) United States Patent
Winn et al.

(10) Patent No.: US 12,705,504 B2
(45) Date of Patent: Aug. 11, 2026

(54) KNOWLEDGE BASE CONSTRUCTION

(71) Applicant: Microsoft Technology Licensing, LLC, Redmond, WA (US)

(72) Inventors: John Michael Winn, Cambridge (GB); John Guiver, Saffron Walden (GB); Samuel Alexander Webster, Cambridge (GB); Yordan Kirilov Zaykov, Cambridge (GB); Maciej Kukla, Cambridge (GB); Daniel Fabian, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 1276 days.

(21) Appl. No.: 15/898,211

(22) Filed: Feb. 15, 2018

(65) Prior Publication Data

US 2019/0213484 A1 Jul. 11, 2019

(30) Foreign Application Priority Data

Jan. 11, 2018 (GB) ..................................... 1800473

(51) Int. Cl.
*G06N 5/022* (2023.01)
*G06F 16/334* (2025.01)
(Continued)

(52) U.S. Cl.
CPC ........... *G06N 5/022* (2013.01); *G06F 16/334* (2019.01); *G06F 16/3346* (2019.01);
(Continued)

(58) Field of Classification Search
CPC ........ G06N 5/022; G06N 20/00; G06N 5/027; G06N 5/042; G06N 5/046; G06N 7/005;
(Continued)

(56) References Cited

U.S. PATENT DOCUMENTS 6,006,242 A 12/1999 Poole et al.
6,056,690 A * 5/2000 Roberts ................ G06F 18/256 600/300

(Continued)

OTHER PUBLICATIONS

Zhang et al., 2017, "DeepDive: Declarative Knowledge Base Construction" (Year: 2017).*

(Continued)

*Primary Examiner* — Abdullah Al Kawsar
*Assistant Examiner* — Jun Kwon
(74) *Attorney, Agent, or Firm* — Barta Jones, PLLC

(57) ABSTRACT

In various examples there is a knowledge base construction and/or maintenance system for use with a probabilistic knowledge base. The system has a probabilistic generative model comprising a process for generating text or other formatted data from the knowledge base. The system has an inference component configured to generate inference results, by carrying out inference using inference algorithms, run on the probabilistic generative model, in either a forward direction whereby text or other formatted data is generated, or a reverse direction whereby text or other formatted data is observed and at least one unobserved variable of the probabilistic generative model is inferred. The inference component is configured to update the knowledge base using at least some of the inference results.

19 Claims, 12 Drawing Sheets

(51) Int. Cl.

| | |
|---|---|
| ***G06F 40/295*** | (2020.01) |
| ***G06N 5/02*** | (2023.01) |
| ***G06N 5/04*** | (2023.01) |
| ***G06N 5/046*** | (2023.01) |
| ***G06N 7/01*** | (2023.01) |
| ***G06N 20/00*** | (2019.01) |

(52) U.S. Cl.
CPC .......... *G06F 40/295* (2020.01); *G06N 5/027* (2013.01); *G06N 5/042* (2013.01); *G06N 5/046* (2013.01); *G06N 7/01* (2023.01); *G06N 20/00* (2019.01)

(58) Field of Classification Search
CPC .. G06N 7/005706; G06N 7/01; G06F 16/334; G06F 16/3346; G06F 40/295
USPC .......................................................... 706/12
See application file for complete search history.

(56) References Cited

U.S. PATENT DOCUMENTS 6,591,258 B1 * 7/2003 Stier .................... G06N 5/022 706/50
6,601,055 B1 * 7/2003 Roberts .................. G06N 7/01 706/45
7,082,430 B1 7/2006 Danielsen et al.
7,096,210 B1 * 8/2006 Kramer ................ G06N 5/025 706/45
7,502,770 B2 * 3/2009 Hillis ...................... G09B 5/00 706/45
7,756,810 B2 7/2010 Nelken et al.
8,005,810 B2 * 8/2011 Naam ................ G06F 16/9535 707/706
8,103,598 B2 1/2012 Minka et al.
8,275,737 B2 * 9/2012 Kupershmidt .......... G06F 16/21 706/60
9,251,467 B2 2/2016 Winn et al.
9,842,166 B1 12/2017 Leviathan
9,864,795 B1 1/2018 Halevy et al.
10,504,198 B1 12/2019 Ward
10,783,162 B1 9/2020 Montague et al.
11,244,113 B2 2/2022 Adderly
11,809,460 B1 11/2023 Rausch
2003/0177115 A1 * 9/2003 Stern .................... G06F 16/334
2004/0059966 A1 * 3/2004 Chan .................. G06F 11/0793 714/48
2004/0095374 A1 * 5/2004 Jojic ...................... G06T 7/215 715/716
2004/0260692 A1 * 12/2004 Brill .................... G06F 16/3347
2005/0086222 A1 4/2005 Wang et al.
2005/0154690 A1 7/2005 Nitta et al.
2010/0077324 A1 * 3/2010 Harrington ............ G06F 9/451 715/762
2011/0119050 A1 5/2011 Deschacht et al.
2011/0251984 A1 10/2011 Nie et al.
2011/0307435 A1 12/2011 Overell et al.
2012/0203752 A1 * 8/2012 Ha-Thuc ................ G06F 16/35 707/706
2014/0201126 A1 * 7/2014 Zadeh ................. A61B 5/7221 706/52
2014/0250046 A1 9/2014 Winn
2014/0280353 A1 9/2014 Delaney
2014/0337306 A1 11/2014 Gramatica
2015/0006501 A1 1/2015 Talmon et al.
2015/0248222 A1 9/2015 Poznanski et al.
2016/0012020 A1 1/2016 George et al.
2016/0012122 A1 1/2016 Franceschini et al.
2016/0063061 A1 3/2016 Meyerzon et al.
2016/0140445 A1 5/2016 Adderly et al.
2016/0323411 A1 11/2016 Lee et al.
2017/0024652 A1 1/2017 Kipersztok et al.
2017/0199928 A1 7/2017 Zhang et al.
2017/0235816 A1 8/2017 Livshits
2017/0316322 A1 * 11/2017 Perincherry .......... G06F 16/951
2018/0060306 A1 3/2018 Starostin et al.
2018/0075359 A1 3/2018 Brennan
2019/0081983 A1 * 3/2019 Teal ..................... G06F 21/602
2019/0155947 A1 * 5/2019 Chu ........................ G06N 5/04
2020/0089802 A1 3/2020 Ronen
2021/0026846 A1 1/2021 Subramanya
2021/0104234 A1 4/2021 Zhang
2021/0157858 A1 5/2021 Stevens
2021/0191949 A1 6/2021 Sato
2021/0209500 A1 7/2021 Hu
2021/0312919 A1 10/2021 Sato
2021/0326519 A1 10/2021 Lin
2022/0019740 A1 1/2022 Meyerzon et al.
2022/0261545 A1 8/2022 Lauber
2022/0300544 A1 9/2022 Potter
2023/0030086 A1 2/2023 Martinez Ayala
2023/0067688 A1 3/2023 Pochernina et al.
2023/0076773 A1 3/2023 Pochernina et al.
2023/0342629 A1 10/2023 Panda

OTHER PUBLICATIONS

Niu et al., 2012, "Deep Dive: Webscale Knowledge-base Construction using Statistical Learning and Inference" (Year: 2012).*
Chu et al., 2015, "Katara: A Data Cleaning System Powered by Knowledge Bases and Crowdsourcing" (Year: 2015).*
Jordan, 2015, "Machine learning: Trends, perspectives, and prospects" (Year: 2015).*
Conneau et al., 2017, "Supervised Learning of Universal Sentence Representations from Natural Language Inference Data" (Year: 2017).*
Nguyen et al, 2017, "Query-Driven On-The-Fly Knowledge Base Construction" (Year: 2017).*
Qi et al, 2010, "Measuring conflict and agreement between two prioritized knowledge bases in possibilistic logic" (Year: 2010).*
Devlin, et al., "BERT: Pre-Training of Deep Bidirectional Transformers for Language Understanding", In Proceedings of Conference of the North American Chapter of the Association for Computational Linguistics: Human Language Technologies, vol. 1 (Long and Short Papers), Jun. 2009, pp. 4171-4186.
Klimt, et al., "The Enron Corpus: A New Dataset for Email Classification Research", In Publication of Springer, Sep. 20, 2004, pp. 217-226.
Liu, et al., "RoBERTa: A Robustly Optimized BERT Pretraining Approach", In Repository of arXiv:1907.11692v1, Jul. 26, 2019, 13 Pages.
Loshin, David, "Enterprise Knowledge Management: The Data Quality Approach", Chapter I, In Publication of Morgan Kaufmann, Jan. 17, 2001, 24 Pages.
Maedche, et al., "Ontologies for Enterprise Knowledge Management", In Journal of IEEE Intelligent Systems, vol. 18, Issue 2, Mar. 2003, pp. 26-33.
Minka, et al., "Infer.NET 0.3", Retrieved from: https://web.archive.org/web/20181013050802/https://dotnet.github.io/infer/, Oct. 13, 2018, 2 pages.
Radicati, et al., "Email Statistics Report, 2015-2019", Retrieved from: https://www.radicati.com/wp/wp-content/uploads/2015/02/Email-Statistics-Report-2015-2019-Executive-Summary.pdf, 2019, 4 Pages.
Rajput, et al., "Alexandria in Microsoft Viva Topics: from Big Data to Big Knowledge", Retrieved from: https://www.microsoft.com/en-US/research/blog/alexandria-in-microsoft-viva-topics-from-big-data-to-big-knowledge/, Apr. 26, 2021, 12 Pages.
Sang, et al., "Introduction to the CoNLL-2003 Shared Task: Language-Independent Named Entity Recognition", In Proceedings of Seventh Conference on Natural Language Learning at HLT-NAACL, Jun. 12, 2003, 6 Pages.
Szekely, et al., "Building and Using a Knowledge Graph to Combat Human Trafficking", In Publication of Springer, Oct. 11, 2015, pp. 205-221.
Voigt, et al., "The EU General Data Protection Regulation (GDPR)", In Publication of Springer, Aug. 10, 2017, 40 pages.

(56) References Cited

OTHER PUBLICATIONS

Winn, et al., "Alexandria: Unsupervised High-Precision Knowledge Base Construction using a Probabilistic Program", In Proceedings of Automated Knowledge Base Construction, Nov. 17, 2018, 20 Pages.
Winn, et al., "Enterprise Alexandria: Online High-Precision Enterprise Knowledge Base Construction with Typed Entities", In Proceedings of 3rd Conference on Automated Knowledge Base Construction, Jun. 22, 2021, pp. 1-13.
Yamada, et al., "LUKE: Deep Contextualized Entity Representations with Entity-aware Self-attention", In Proceedings of Conference on Empirical Methods in Natural Language Processing, Nov. 16, 2020, pp. 6442-6454.
Zhang, et al., "ERNIE: Enhanced Language Representation with Informative Entities", In Proceedings of 57th Annual Meeting of the Association for Computational Linguistics, Jul. 28, 2019, pp. 1441-1451.
"International Search Report and Written Opinion Issued in PCT Application No. PCT/US2019/012237", Mailed Date: Mar. 28, 2019, 13 Pages.
Reinanda, Ridho, "Entity Associations for Search", Thesis Submitted in Dissertation of Dutch Research School for Information and Knowledge Systems, May 11, 2017, 184 Pages.
"Probabilistic programming for advancing machine learning", In Publication of Defense Advanced Research Projects Agency, Apr. 1, 2013, pp. 1-47.
"Knowledge Base Generation for Analysis of Text", Provisional Application as Filed in U.S. Appl. No. 62/435,480, filed Dec. 16, 2016, 96 Pages.
Carlson, et al., "Toward an architecture for never-ending language learning", In Proceedings of Twenty-Fourth AAAI Conference on Artificial Intelligence, Jul. 11, 2010, 8 Pages.
Chaiken, et al., "SCOPE: easy and efficient parallel processing of massive data sets", In Proceedings of VLDB Endowment, vol. 1, Issue 2, Aug. 2008, pp. 1265-1276.
Dong, et al., "Knowledge Vault: A Web-Scale Approach to Probabilistic Knowledge Fusion", In Proceedings of 20th ACM SIGKDD international conference on Knowledge discovery and data mining, Aug. 25, 2014, pp. 601-610.
Fader, et al., "Identifying relations for open information extraction", In Proceedings of the Conference on Empirical Methods in Natural Language Processing, Jul. 27, 2011, pp. 1535-1545.
Gupta, et al., "Biperpedia: An Ontology for Search Applications", In Proceedings of VLDB Endowment, vol. 7, Issue 7, Mar. 2014, pp. 505-516.
Hoffart, et al., "YAGO2: A spatially and temporally enhanced knowledge base from Wikipedia", In Journal Artificial Intelligence, vol. 194, Jan. 2013, pp. 28-61.
Minka, Thomas P, "Expectation propagation for approximate Bayesian inference", In Proceedings of 17th Conference in Uncertainty in Artificial Intelligence, Aug. 2, 2001, pp. 362-369.
"Infer.NET 2.6", Retrieved from <<http://infernet.azurewebsites.net/>>, Nov. 25, 2014, 1 Page.
Mitchell, et al., "Never-Ending Learning", In Proceedings of Twenty-Ninth AAAI Conference on Artificial Intelligence, Jan. 25, 2015, 9 Pages.
Niu, et al., "Elementary: Large-scale Knowledge-base Construction via Machine Learning and Statistical Inference", In International Journal on Semantic Web and Information Systems, vol. 8, Issue 3, Jul. 2012, pp. 1-23.
Richardson, et al., "Markov Logic Networks", In Journal of Machine Learning, vol. 62, Issue 1, Feb. 1, 2006, pp. 107-136.
Roy, Daniel, "PROBABILISTIC-PROGRAMMING.org", Retrieved from <<http://probabilistic-programming.org/wiki/Home>>, Retrieved on: Nov. 14, 2017, 4 Pages.
Schmitz, et al., "Open Language Learning for Information Extraction", In Proceedings of the Joint Conference on Empirical Methods in Natural Language Processing and Computational Natural Language Learning, Jul. 12, 2012, pp. 523-534.
Surdeanu, et al., "Overview of the English slot filling track at the TAC2014 knowledge base population evaluation", In Proceedings of 7th Text Analysis Conference, Nov. 17, 2014, 15 Pages.
Weikum, et al., "From Information to Knowledge: Harvesting Entities and Relationships from Web Sources", In Proceedings of Twenty-Ninth ACM SIGMOD-SIGACT-SIGART Symposium on Principles of Database Systems, Jun. 6, 2010, pp. 65-76.
Yangel, et al., "Belief Propagation with Strings", In Technical Report MSR-TR- 2017-11, Feb. 15, 2017, pp. 1-9.
Zhang, Ce, "DeepDive: A Data Management System for Automatic Knowledge Base Construction", In PHD Thesis of University of Wisconsin-Madison, Aug. 2015, 205 Pages.
Communication pursuant to Article 94(3) EPC Received for European Application No. 19701418.6, mailed on Mar. 25, 2024, 8 pages.
Non-Final Office Action mailed on Dec. 21, 2023, in U.S. Appl. No. 17/460,123, 52 pages.
Non-Final Office Action mailed on Dec. 21, 2023, in U.S. Appl. No. 17/493,819, 52 pages.
Reinanda. R., "UVA-DARE (Digital Academic Repository)." accessed on URL: https://pure.uva.nl/ws/files/12382976/Reinanda_Thesis_complete.pdf, May 11, 2017, 185 pages.
Final Office Action issued in U.S. Appl. No. 17/493,819, mailed on May 16, 2024, 59 Pages.
Notice of Allowance mailed on Sep. 9, 2024, in U.S. Appl. No. 17/493,819, 22 pages.
Summons to attend oral proceedings pursuant to Rule 115(1) received in European Application No. 19701418.6, mailed on Nov. 25, 2024, 10 pages.
Communication under Rule 71(3) Received for European Application No. 19701418.6, mailed on May 13, 2025, 7 pages.
Communication under Rule 71(3) Received for European Application No. 19701418.6, mailed on Sep. 4, 2025, 9 pages.
Decision to grant a European patent pursuant to Article 97(1) received in European Application No. 19701418.6, mailed on Jan. 29, 2026, 2 pages.

* cited by examiner

KNOWLEDGE BASE CONSTRUCTION

COPYRIGHT NOTICE

A portion of the disclosure of this patent contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATION

This application claims priority to UK Application Serial Number 1800473.9, entitled "KNOWLEDGE BASE CONSTRUCTION," filed Jan. 11, 2018, which is incorporated herein in its entirety.

BACKGROUND

Search engines and conversational assistants require huge stores of knowledge in order to answer questions and understand basic facts about the world. Such a store of knowledge is referred to as a knowledge base and comprises facts about entities and relations between the entities. Existing knowledge bases are at least partly manually constructed and this makes it time consuming and expensive to scale up construction of knowledge bases and maintain the data in those knowledge bases. Forming knowledge bases which are accurate, up-to-date and complete remains a significant challenge.

The embodiments described below are not limited to implementations which solve any or all of the disadvantages of known knowledge base construction systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a knowledge base construction and/or maintenance system for use with a probabilistic knowledge base. The system has a probabilistic generative model comprising a process for generating text or other formatted data from the knowledge base. The system has an inference component configured to generate inference results, by carrying out inference using inference algorithms, run on the probabilistic generative model, in either a forward direction whereby text or other formatted data is generated, or a reverse direction whereby text or other formatted data is observed and at least one unobserved variable of the probabilistic generative model is inferred. The inference component is configured to update the knowledge base using at least some of the inference results.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present technology provides a system for automated, unsupervised, high-precision knowledge base construction and/or maintenance. By "unsupervised" it is meant that labelled training data is not essential in order to construct the knowledge base. This is achieved through the use of a probabilistic generative model which defines a process for generating text or other formatted data from a probabilistic knowledge base. Variables of the process are represented using probability distributions representing belief about values of those variables. As instances of the variables are observed, the probability distributions are updated using inference algorithms. Probability distributions of the variables are stored in the knowledge base.

A probabilistic knowledge base is a knowledge base comprising a plurality of facts and where uncertainty about the facts is stored. The facts comprise values and one or more of the values may be missing or uncertain.

By using one coherent probabilistic model to describe how text and/or other formatted data items are generated from the probabilistic knowledge base, the knowledge base construction and maintenance system uses a consistent, principled approach that is found to give accurate results which scale up successfully to web scale knowledge bases. It is possible to propagate uncertainty information through the coherent probabilistic model and this facilitates accuracy and quality of results. It is possible to propagate uncertainty information through the coherent probabilistic generative model from end to end in either direction. This enables high accuracy in generation and maintenance of the knowledge base.

Using a single coherent probabilistic model removes the need to create and train many separate components such as tokenizers, named entity recognizers, part of speech taggers, fact extractors, linkers and so on. A disadvantage of having such multiple components is that they encode different underlying assumptions and this reduces the accuracy of the combined system.

Figure 1:
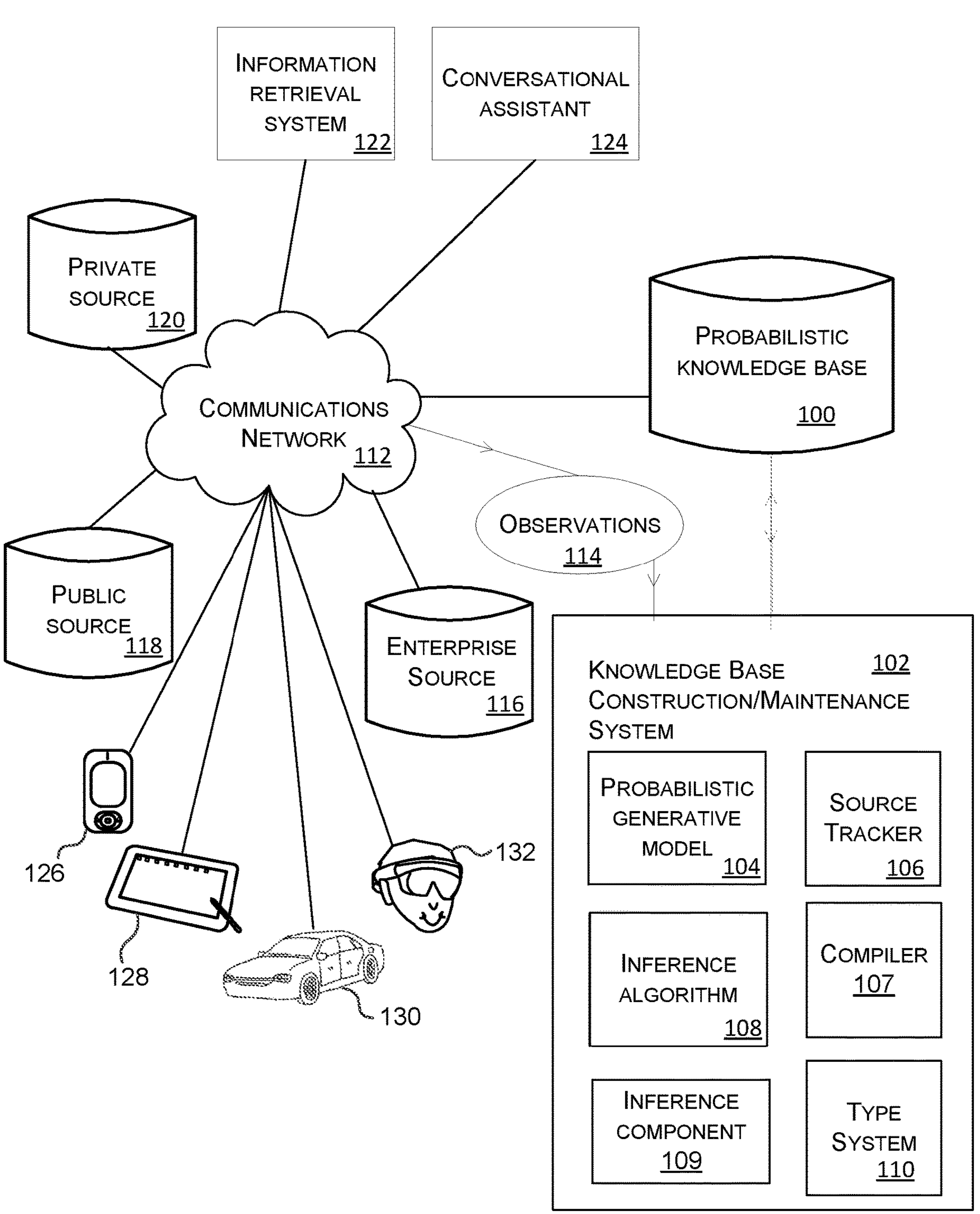
FIG. 1 is a schematic diagram of a knowledge base construction and maintenance system.

FIG. 1 is a schematic diagram of a knowledge base construction and/or maintenance system 102 connected to a probabilistic knowledge base 100. The knowledge base construction and/or maintenance system 102 adds knowledge to probabilistic knowledge base 100 by mining observations 114 from one or more data sources 116, 118, 120. The observations 114 comprise text or other formatted data items. A formatted data item is data arranged in a specified spatial and/or temporal arrangement. Typical examples of formatted data items include, but are not limited to, unstructured text, or structured or formatted text (such a tabular item or emphasized text) as represented by a mark-up language, and other data types such as image, video, or audio items.

The data sources include private source 120, public source 118 and enterprise source 116. Each of the private source 120, public source 118 and enterprise source 116 comprise data from which the observations 114 are obtained or extracted. Whether the source is private, public or an enterprise source is determined according to an address of the source or other identifiers associated with the data itself. Some examples of private, public and enterprise sources are now given to aid understanding of the invention and these are not intended to limit the scope of the technology. An example of a private source is a personal email account. An example of a public source is a public web site. An example of an enterprise source is an Enterprise Data Management document library.

In the example of FIG. 1 the probabilistic knowledge base 100 is accessible by an information retrieval system 122 and a conversational assistant 124. When an end user uses a smart phone 126, tablet computer 128, automated vehicle 130 or head worn augmented reality computer 132 to send a query to the information retrieval system 122, the information retrieval system 122 is able to query the probabilistic knowledge base to obtain facts, uncertainty of the facts and relationships between the facts. The retrieved knowledge from the knowledge base is then incorporated into the results returned by the information retrieval system 122 to the computing device which requested it. In a similar manner a conversational assistant is able to receive natural language queries from computing entities such as the smart phone 126, tablet computer 128, automated vehicle 130 or head worn augmented reality computer 132 and is able to retrieve knowledge from the knowledge base in response to the natural language queries. The retrieved knowledge is then used by the conversational assistant to facilitate its understanding and reasoning and formulate useful and relevant replies to the natural language query.

The knowledge base construction and/or maintenance system 102 comprises a probabilistic generative model 104, an optional source tracker 106, an inference algorithm 108, an inference component 109 and a type system 110. The probabilistic generative model 104 is a process which generates text or other formatted data items from the probabilistic knowledge base 100. The probabilistic generative model 104 is most conveniently written as a probabilistic program, though may be written in a high-level language supporting constructs for probabilistic variables such as Infer.Net. Optionally, a compiler 107, such as that described in U.S. Pat. No. 8,103,598 "Compiler for Probabilistic Programs", Minka et al. issued on 24 Jan. 2012, assigned to Microsoft Technology Licensing LLC, may be used to compile the model into a probabilistic inference algorithm 108 able to respond to a set of inference queries on the model, or the inference algorithm may be manually constructed to respond to general classes of query. More detail about the probabilistic generative model 104 is given below with reference to FIG. 3.

In the embodiments described herein the inference component 109 carries out inference using the inference algorithm 108 in either a forward direction whereby text or other formatted data is generated from the knowledge base, or a reverse direction whereby text or other formatted data is observed and at least one unobserved variable of the probabilistic generative model is inferred.

The source tracker 106 is optional and is used where it is desired to track sources of the observations 114 for access control, source citation, or other purposes. When an observation is received 114 the source tracker obtains information about the source of the observation such as a description of the source, a link to the source, security information about the source, privacy information about the source, or other information. An example of privacy information about the source is where an item of data is subject to privacy protection and the privacy information indicates this. An example of security information about the source is information about whether an item of data is stored in a location with read access control.

The source tracker 106 is configured to determine source tracking information of the observed text or other formatted data, the source tracking information comprising, for individual observations from the observed text or other formatted data, any one or more of: an identifier of a source of the observation, security information of the observation, privacy information of the observation.

The source tracker 106 is configured to track an influence of the individual observations on unobserved or observed variables of the probabilistic generative model. For example, if an inferred fact has a single restricted source, then a knowledge base query retrieving that fact is subject to the same restriction (in some examples). Whereas if the inferred fact had both a restricted source and a public source, then that fact is publicly consumable (in some examples).

In some cases the system has user settings functionality comprising one or more source tracking rules, thresholds or criteria set according to the user settings, and the knowledge base system 102 takes into account the source tracking rules, thresholds or criteria when observing at least one variable of the probabilistic model and/or inferring at least one variable of the probabilistic model. The source tracker is configured to store the source tracking information in the knowledge base such that other applications are able to retrieve the source tracking information by querying the knowledge base.

The inference component 109 carries out inference using the observations 114 and the inference algorithm 108. The results of the inference component 109 comprise probability distributions of at least one of the variables in the probabilistic program. The inference component 109 uses standard inference algorithms such as expectation propagation, or Variational Message Passing, or other standard inference algorithms which are well known to the skilled person. Inference over string values is handled using weighted automata as known to the skilled person and described in US patent U.S. Pat. No. 9,251,467 entitled "Probabilistic parsing" and assigned to Microsoft Technology Licensing, LLC and also in "Belief Propagation with Strings" by Yangel et al. Technical Report MSR-TR-2017-11, Microsoft Research, February 2017. Other methods of inference over string values are used in some cases.

The type system 110 comprises a library of possible types, and for each type one or more formats to convert a value of the type to a formatted value such as text, or other formatted data. In some cases the formats are specified as a probabilistic program which converts between the uncertain values of the type into strings or other formatted data. The type system 110 also stores, for each type, a prior distribution over formats. More detail about the types is given later in this document.

Figure 2:
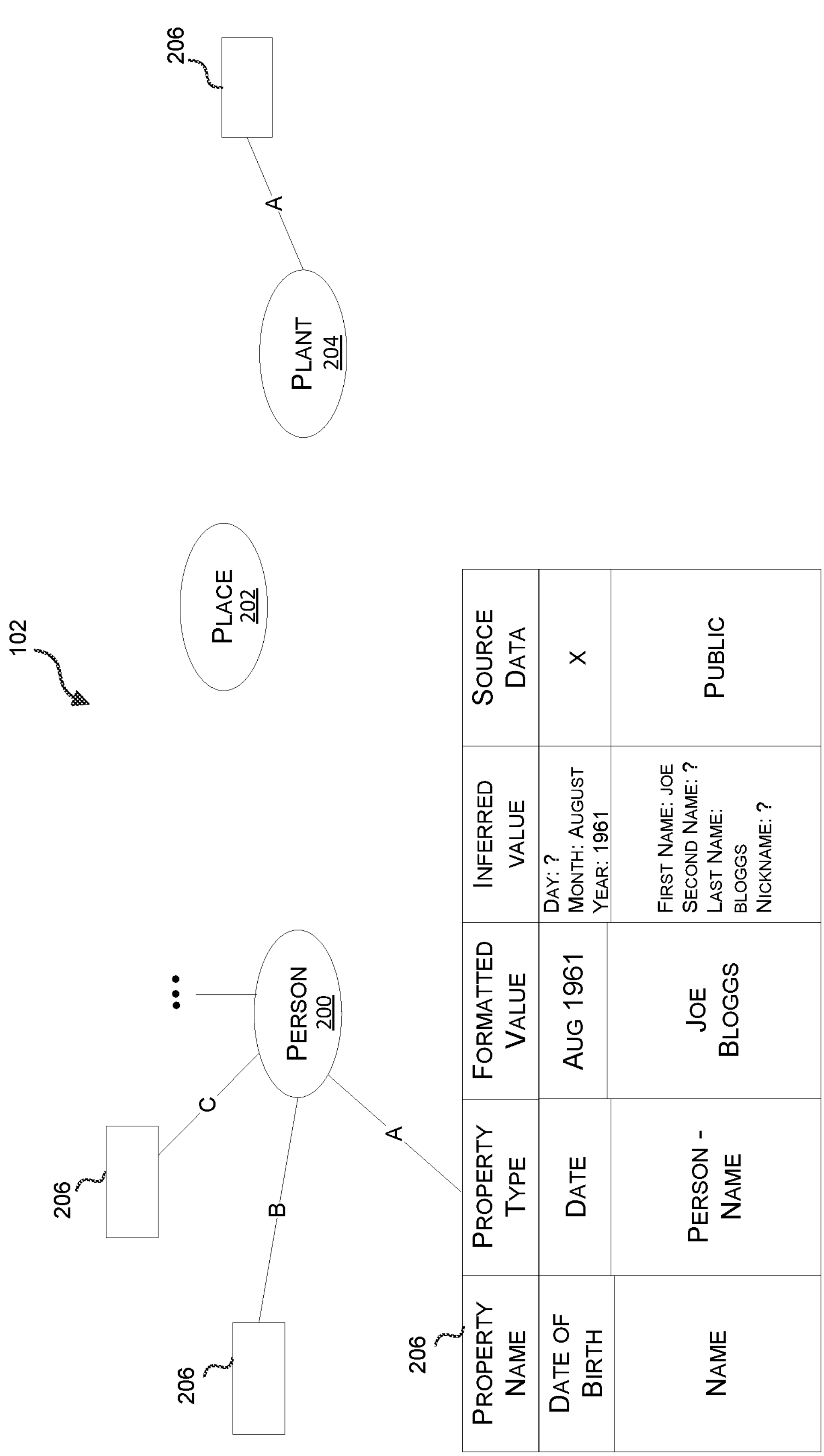
FIG. 2 is a schematic diagram of part of a knowledge base

FIG. 2 is a schematic diagram of part of the probabilistic knowledge base 100 of FIG. 1. The knowledge base 100 comprises a plurality of entity types of which only three are shown in FIG. 2 although in practice there are many hundreds of thousands or millions of entity types. In the example of FIG. 2 the entity types are PERSON 200, PLACE 202, and PLANT 204.

Each entity type has one or more uncertain entities, where an entity is an instance of an entity type. In the example of FIG. 2 the entity type PERSON 200 has three entities 206 A, B and C, the entity type PLACE 202 has no entities, and the entity type PLANT 204 has one entity 206. Entity A of the PERSON 200 entity type is illustrated in full in FIG. 2 whereas the other entities 206 are illustrated in collapsed schematic form for clarity. Each entity has one or more properties where a property is a characteristic of an entity which takes an uncertain value. Each property has a type from the type library which has one or more associated formats to convert a property value of the type into a formatted version of the property value, such as text or other formatted data. In the example of FIG. 2, Entity A of the PERSON 200 entity type comprises two properties which in this example are "date of birth" and "name". The property "date of birth" has the property type "date" and takes the value "August 1961". Uncertainty data is stored in the knowledge base as indicated in the inferred value column of the table in FIG. 2. In the case of the property name "date of birth" the day is uncertain and is represented by a question mark. The month is inferred as "August" and the year is inferred as "1961". The property types are parameterized in some examples as explained in more detail below. Together the properties and types of the properties of an entity type are referred to as a schema of the entity type; all the entities of a given entity type have the same schema. Thus a schema is a definition of an entity type.

Where source tracking is used the knowledge base stores source data associated with one or more of the property values of an entity and in the example of FIG. 2 this is illustrated as x for the property "date of birth" and value "August 1961", where x represents an identifier of a source from which the value "August 1961" was observed.

The knowledge base is able to store alternative (conflicting) values although this is not depicted in FIG. 2. For example, 5 May 1976 and 5 May 1977 are conflicting values but might be stored as alternatives against the same entity if there was sufficient evidence that these refer to the same entity. Where source tracking is used, source data is maintained and stored for each alternative. Alternative values for a property represent different possible conflicting values, only one of which could actually be true. Such alternative values are very different to sets of values, where many values can be true for the same person (such a person who is a singer and a songwriter). For this reason, sets are represented in the probabilistic generative model 104 very differently to alternatives, using a specific set type described in more detail later in this document.

In the example of FIG. 2 the entity A has a second property which is "name" and this property has the type "person name" and the value "Joe Bloggs". There is uncertainty about the second name and nickname as indicated by the question marks in the inferred value column of the table in FIG. 2.

In the example of FIG. 2 the entity A has only two properties although there may be one or more properties. The two properties and their types form part of the schema of entity type PERSON 200 in the example of FIG. 2.

The values of the properties in FIG. 2 for entity A of the PERSON entity type are incomplete although in some cases these will be complete. Thus incomplete values of properties are present (such as a year of birth rather than a full date of birth) or missing values of properties are present. The task of the knowledge base construction and/or maintenance system 102 is to add more entity types, entities, properties, or templates to the knowledge base and/or to update existing data in the knowledge base. It does this by using the observations to carry out inference and update probability distributions of the variables of the probabilistic generative model. Templates are text or other formatted data with placeholders to insert formatted values of properties of an entity (an entity is an instance of an entity type, and is also referred to herein as an entity value). There are typically many templates per entity type, and these may be represented as a distribution over string values, or may be enumerated into a list. Templates combine the formatted property value into text or other formatted data.

Figure 3:
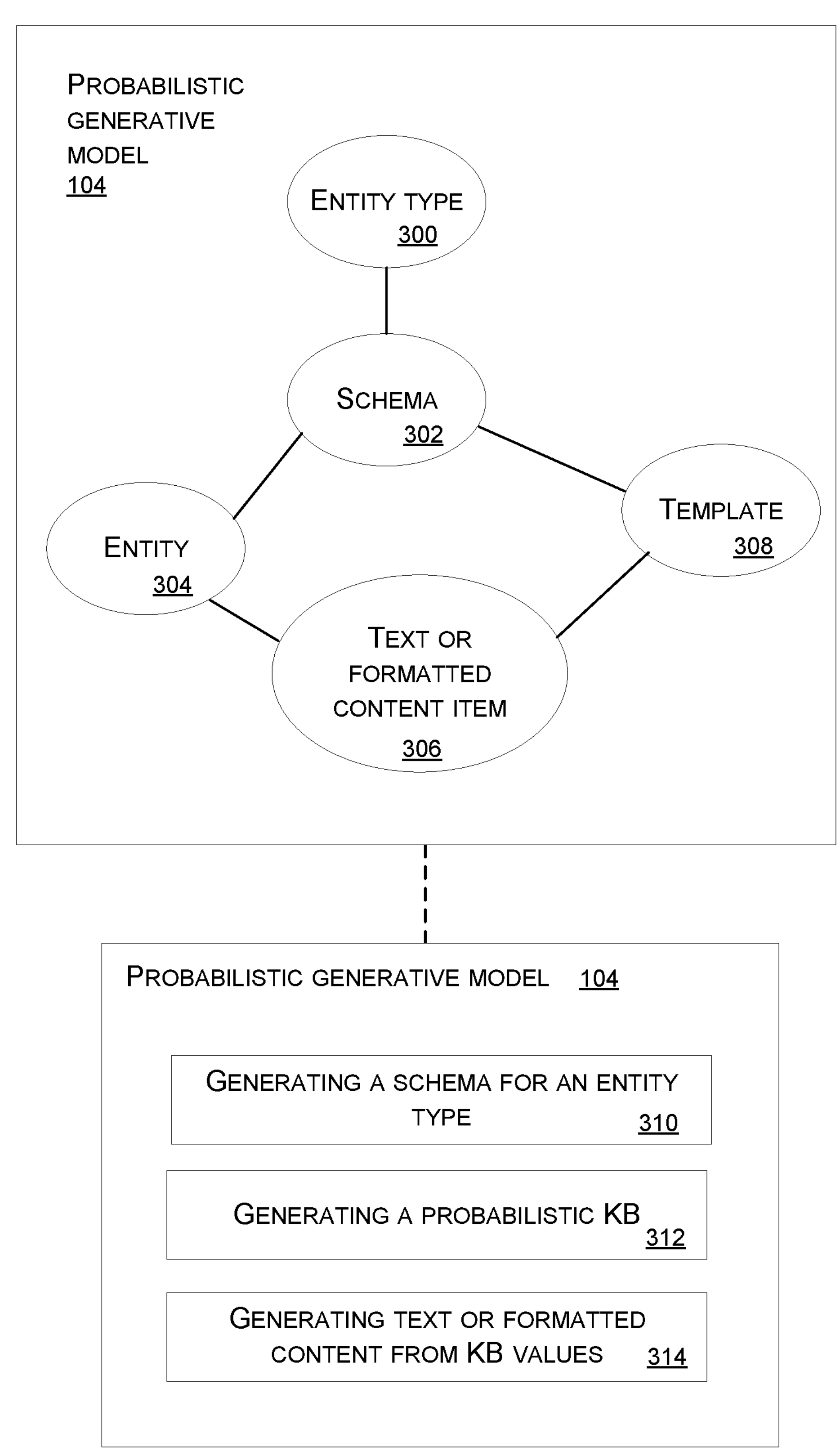
FIG. 3 is a schematic diagram of a probabilistic generative model used by the knowledge base construction and maintenance system of FIG. 1.

More detail about the probabilistic generative model is now given with reference to FIG. 3. The probabilistic generative model 104 is a process which generates text or other formatted data items 306 from the knowledge base where the knowledge base comprises at least an entity type 300, an entity 304 of the entity type where the entity has properties according to a schema 302 and where formatted values of the properties of the entity 304 are inserted into a template 308 to form the text or formatted data item 306. The probabilistic generative model 104 comprises three processes, a process 310 for generating a schema for an entity type, a process 312 for generating a probabilistic knowledge base, and a process 314 for generating text or formatted data from knowledge base values. The process 312 for generating a probabilistic knowledge base is essentially a process which generates facts which are values of properties of an entity, and this process involves retrieving facts from the data sources 116, 118, 120. The term "fact retrieval" is used to refer to running inference on the overall model to infer the properties of an entity 304 given the text 306 or other formatted data, the schema 302 and a set of templates 308.

The probabilistic generative model comprises for each entity type, an associated schema comprising a plurality of property types, each property type comprising one or more formats to convert a property value to a formatted property value which is at least part of an instance of the text or other formatted data.

Several example probabilistic programs are now given which are part of the probabilistic generative model 104 in some cases. The programs are written in C#-like syntax where the keyword "random" takes a distribution and returns an uncertain value with that distribution. The "uniform" function takes a collection of objects and returns a uniform distribution over these objects. In the programs the lines beginning with the symbol // are comments which explain the operation of the program and are not part of the instructions executed by a computer.

The process for generating a schema for an entity type comprises specifying the number of properties in the schema, sampling a set of names for each of those properties, the types of those properties, and any parameters of the each property type. The probabilistic generative model 104 has a plurality of prior probability distributions which represent knowledge about the likely values of the number of properties, the names of the properties, the types of the properties and the parameters of the properties. Values are drawn from these prior probability distributions to create the schema. Because the prior probability distributions are updated over time as more observations 114 become available, the accuracy and quality of the schema improves. The following program generates a schema for an entity type consisting of a set of properties, each with a plurality of names and a type.

```
// Loop over properties in the schema
   for (int i=0;i<props.Length;i++) {
   // Pick number of names from geometric distribution
   int numNames=random Geometric(probNames);
   // Allocate array for storing names
   var names=new string[numNames];
   // Pick names from property name prior
   for(int j=0;j<numNames;j++) {
      names[j]=random Property.NamePrior;
   }
// Set generated strings as property names
props[i].Names=names;
// Pick one built-in type prior at random
var typePrior=random Uniform(typePriors);
// Draw a type instance from the type prior.
props[i].Type=random typePrior;
}
```

The above program shows how names are drawn from a prior over property names. Types are drawn from a mixture over all built-in type priors. Types are able to have parameters, for example, a Set type has a parameter for the element type of the set. The type prior for each type defines a joint prior over these parameters.

An example of a probabilistic program which generates a probabilistic knowledge base is now given. This is an example of part of the probabilistic generative model 104.

```
// Create set of entities (of the same type)
Entity[] entities = new Entity[entityCount];
// Loop over entities of this type
for (int j=0;j<entities.Length;j++) {
  // Loop over properties in the schema
  for (int i=0;i<props.Length;i++) {
       // Pick number of alts from geometric dist
       int numAlts = random Geometric(probAlt);
    object[] alts = new object[numAlts];
    // Loop over alternatives
    for(int k=0;k<alts.Length;k++) {
       // Choose a property value from the prior
       alts[k]=random props[i].Type.Prior;
    }
    // Set alternatives as the property value
    entities [j][i]=alts;
  }
}
```

The example probabilistic program immediately above generates a probabilistic knowledge base comprising a plurality of entities of a given type. Each entity has values for each property of the entity type. For example, an entity of type "person" has a value for the "DateOfBirth" property. To allow for disagreement over the value of a property, an entity is able to have a plurality of alternative property values as explained above with reference to FIG. 2. For example, multiple dates of birth for a person entity where there is disagreement about exactly when they were born. In the probabilistic program given above, first entityCount entities are created. For each entity and property, the number of alternative values if drawn from a (1-based) geometric distribution with parameter probAlt. Each alternative value is then drawn from the prior for that property type.

The probabilistic generative model 104 also comprises a process for generating text or other formatted data items from values of the knowledge base 100. The process for converting typed values in the knowledge base into unstructured text is now described with reference to FIG. 4.

First, an entity to describe is selected 400 at random from the knowledge base 100. The knowledge base 100 has source tracking data available in some cases as described with reference to FIG. 2.

Once an entity has been selected 400 a property of the entity is selected 402 and for the selected property a property type format prior is accessed 404. The property value of the selected property is converted 406 into a string value using a format drawn from the type-specific format prior. For example, the date 6 Jul. 1946 is converted into the string "July 1946" using the format "MMMM yyyy" where that format has been drawn from the type-specific format prior. If there are more properties of the entity at check 408 the process repeats from operation 402. Once there are no further properties the next task is to embed the computed string property values into a natural sentence, or part of one. To do this, a template is selected 410. An example template, is "{name} was born on {date_of_birth} in {place_of_birth}". The template is selected 410 at random from a provided set of templates (the templates are learnt as described later in this document). These templates are drawn from a suitable prior over strings that enforces that braces occur at word boundaries. The template is filled 412 by replacing each property placeholder with the corresponding value string. Finally, suitable prefix and suffix strings (obtained from observations 114) are concatenated 414, allowing the completed template to appear inside a larger section of text. An example probabilistic program defining this process is now given.

```
// Pick an entity to talk about at random
Entity entity=random Uniform(entities);
// Loop over properties of that entity
for (int i=0;i<props.Length;i++) {
   // Pick a format from type-specific prior
   var format=random props[i].Type.FormatPrior;
   // Pick an alternative value to use
     var alt=random Uniform(entity[i]);
   // Use format to convert value into string
   propStr[i]=alt.ToString(format);
}
// Pick template e.g. "{name}was born on {DoB}"
string template=random Uniform(templates);
// Fill in template, using the string values
string s=string.Format(template, propStr);
// Add text either side to complete the extract
string text=Prefix( )+s+Suffix( );
```

Figure 4:
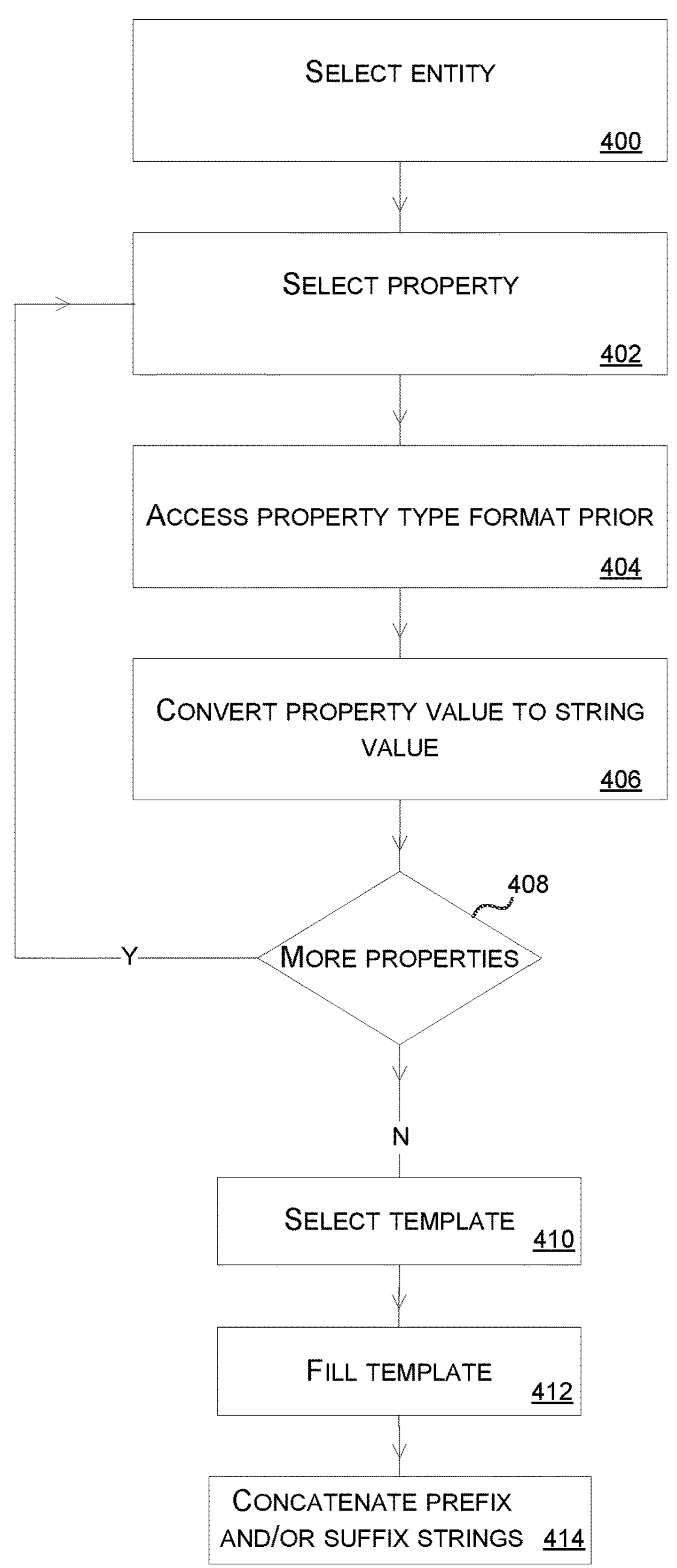
FIG. 4 is a flow diagram of a method of generating text or other formatted data using the probabilistic generative model of FIG. 3 and a knowledge base.

In an example, the process of FIG. 4 is used by the conversational assistant 124 to generate natural language text comprising facts from the probabilistic knowledge base.

In this case the conversational assistant 124 sends a request to the knowledge base construction and/or maintenance system specifying the entity (or a range of possible entities) to be selected at operation 400. The knowledge base construction and/or maintenance system carries out the method of FIG. 4 and returns the concatenation result of operation 414 to the conversational assistant.

The process of FIG. 4 is also applicable in the case that the knowledge base is used to generate other formatted data items which are not text, such as structured or emphasized text, or other formatted data items.

The process of FIG. 4 is carried out using inference on the probabilistic generative model 104. Where source tracking is used this is not part of the probabilistic generative model 104. The source tracker 106 takes into account source tracking rules, thresholds or criteria as described above with reference to FIG. 1. For example, where the source tracking rules comprise a rule that private sources are to be excluded, the converted property values 406 exclude values derived from exclusively private sources. In a similar way the properties available to the process of FIG. 4 to select from may exclude entities from private sources. Thus the source tracker 106 uses the source tracking rules, thresholds or criteria to control the data from the knowledge base from which the process of FIG. 4 selects.

More detail about the type system 110 is now given. In an example the library of types comprises the following built-in types: Date, PersonName, Place, Hierarchy, Quantity, Code. The Code type is for properties such as Zone Improvement Plan (ZIP) code, currency code, International Standard Book Number (ISBN) number, Internet Protocol (IP) address, etc., and is parameterized by regular-expressions-like patterns. There is also a set type Set<T> whose element type T can have any of the above types—for example, a set of people's names is written as Set<PersonName>. There is also a 'catch-all' type that can generate any string value—this is used to discover properties which are not compatible with any of the built-in types.

Each built-in type has a set of type parameters (such as the element type of a Set). A manually-specified TypePrior defines a distribution over instances of the type, including all type parameters. Every instance of a type defines a prior over values of the type (Prior), which may depend on the type parameters and may be learned from data. In addition, each type has a ToString(value,format) method, implemented as a probabilistic program, which converts (uncertain) values of a type instance into strings. Each type has a prior over format strings (FormatPrior) which defines a distribution over the format that can be passed in to the ToString(value,format) method.

In order to generate a vast knowledge base the knowledge base construction and/or maintenance system is configured to run at least three kinds of large scale inference queries on the probabilistic generative model 104. These include template learning (described with reference to FIG. 5), schema learning (described with reference to FIG. 6) and fact retrieval (described with reference to FIG. 7). In essence, each of these queries infers one of the three variables: templates, schema, and entities, given the other two and the observations 114. Fixing two out of these three is not essential, but helps to keep the inference process efficient and the inference schedule straightforward to parallelize.

The three large scale inference queries may be applied to billions of documents and millions of entities. To achieve this scale, a distributed and optimised version of the inference algorithm 108 is used. This distributed algorithm is written at least partly in a programming language suitable for execution of a distributed computing platform. In addition, a message-passing schedule optimised for rapid convergence is used.

Each built-in property type has a corresponding distribution type (of the probabilistic programming language used) to represent uncertain values of the type and as messages in a message passing process (where the inference component carries out inference by using a message passing process). It is recognized herein that values of these types are often highly structured (such as strings, compound objects, hierarchies and sets) and so distributions are used which are similarly structured. For example, distributions over compound objects combine distributions over the constituent parts of the object, distributions over sets assign probability to subsets of the set, and distributions over hierarchical values exploit the structure of the hierarchy to assign probability to the leaves of the hierarchy.

In some examples, to gain significant speed ups, additional approximations to the Expectation Propagation messages are used. These involve collapsing or removing uncertainty, where this is possible without adversely affecting precision. It is found that it is beneficial to preserve uncertainty in which template was matched, in the part of the matched text corresponding to a property and in the extracted value. Conversely, it is found that it is possible to collapse uncertainty in the entity being referred to in each piece of text, provided this is done conservatively and repeated at each iteration of inference. Each text is assigned to the most probable existing entity, provided the probability of this is above some threshold, or otherwise to a new entity. Further speed ups are achieved by caching and re-using the results of various slow message passing operations.

Figure 5:
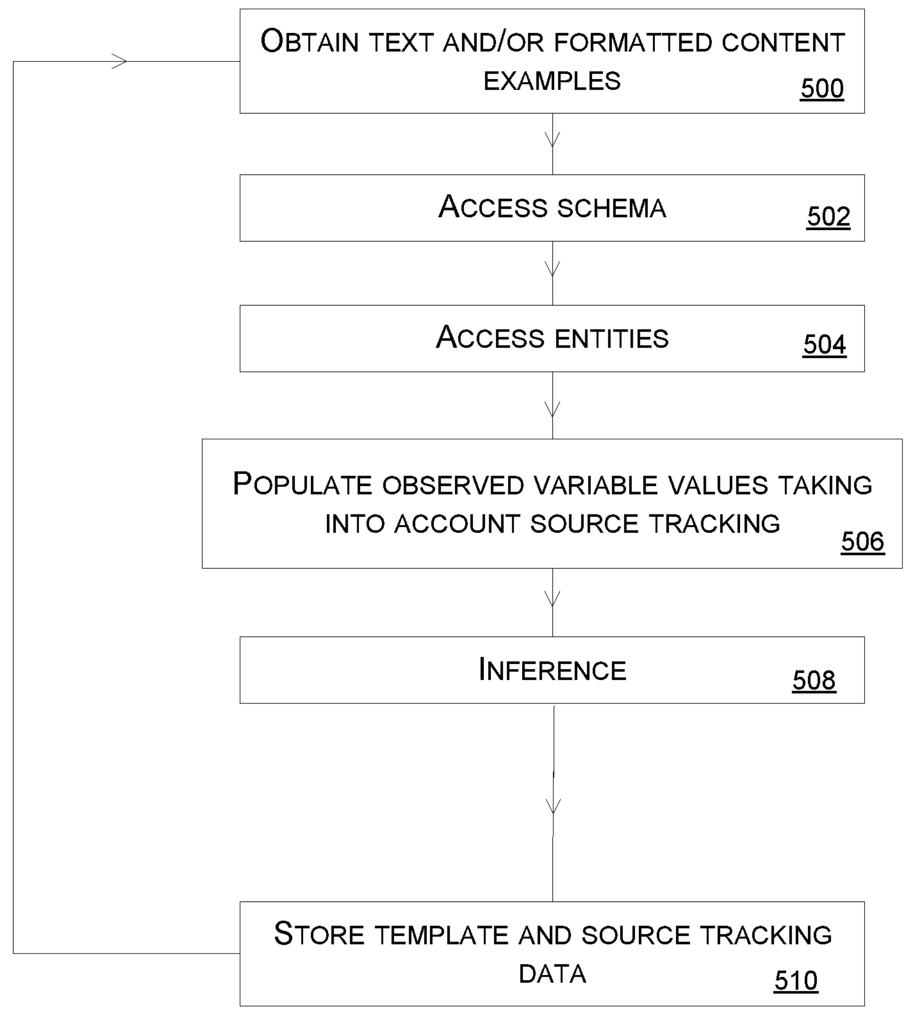
FIG. 5 is a flow diagram of a method of learning a template.

FIG. 5 is a flow diagram of a method of template learning used by the knowledge base construction and/or maintenance system 102. In template learning the template variables are inferred and the other variables of the probabilistic generative model 104 are observed. The first part of FIG. 5 is concerned with determining the values of the variables which are observed.

To observe the variables about the text (or other formatted data items) 500 is not straightforward in the case of billions of observations. To compute the observed text variable from billions of observations (such as billions of documents obtained from the internet by a web crawler), the following process is used to extract snippets from the documents. The inference component carries out forward inference over probabilistic generative model 104 and the result is an uncertain posterior distribution over the text variable. This defines all possible texts that may be generated by the probabilistic generative model 104 for a particular query. The posterior distribution is converted into a plurality of search queries which are executed at scale across the document corpus. In an ideal situation, each possibility expressed by the posterior distribution would be converted into a search query. However, this is not possible to do where there are an infinite number of possibilities, such as where the probability distribution is over values of a number expressed in text. Even where the number of possibilities is not infinite, it is typically still so large that it is impractical to generate a search query for each possibility. Thus the conversion process comprises applying heuristics to approximate the posterior distribution in order to significantly reduce the number of possibilities. The heuristics are expressed as rules, thresholds or other criteria and are used to approximate the posterior distribution and convert the approximated posterior distribution into the search queries. The search queries comprise query terms related to the posterior distribution and the query terms are used to query the document corpus and find portions of text (also referred to as snippets) which contain those query terms. The query terms are used by a conventional search engine such as any well known publicly available search engine for searching the internet. The results of the searches are returned as observations 114 of the text variable. Where source tracking is used, the returned observations 114 include source tracking data.

In some cases, the observed text variable, or observed formatted data variable, is computed from a smaller corpus of documents so that it is not necessary to extract snippets of text or other formatted data by using search queries as described above. In this case the process of obtaining the text and/or formatted data examples simply comprises accessing that data from a store, such as an email server where the examples are emails, or any other type of store.

To observe the variables about the schema the method of FIG. 5 accesses 502 a schema at random from a library of schemas which have been learnt by the knowledge base construction and/or maintenance system. In some cases, rather than making a random selection, a schema is selected on the basis of information about source tracking. The library of learnt schemas includes information, for individual ones of the schemas, about the relative influence of private, public and enterprise observations 114 which contributed to the learnt schema. However, it is not essential for the library of learnt schemas to include such information about the relative influence of private, public and enterprise observations which contributed to the learnt schemas. In this case the process of FIG. 5 accesses 502 one or more schemas at random or in other ways.

To observe the variables about the entities the method of FIG. 5 accesses 504 one or more entities of the selected entity types where some of the property values are known.

The process of FIG. 5 populates 506 the observed variable values in the probabilistic generative model 104, optionally taking into account source tracking. That is, if a user setting specifies to avoid using private sources, the observed variable values are not populated with any information from private sources, or having been inferred at least partly from a private source. Rules, thresholds or criteria are available to enable the process of FIG. 5 select what data to use to populate the observed variable values. The rules, thresholds or criteria are based on contribution levels of different types of the sources.

Once the observed variable values are populated, inference 508 is carried out by the inference engine 108 in a reverse direction. The inference updates the probability distributions representing belief about the templates. As an example, each such probability distribution is enumerated to give enumerated templates which are stored 510 together with source tracking data about sources of the data which contributed to an enumerated template value. In this case the source tracking data includes source tracking data of the observed variables which in this case are the schema, entities and text. The process of FIG. 5 repeats if further templates are to be inferred.

Figure 9:
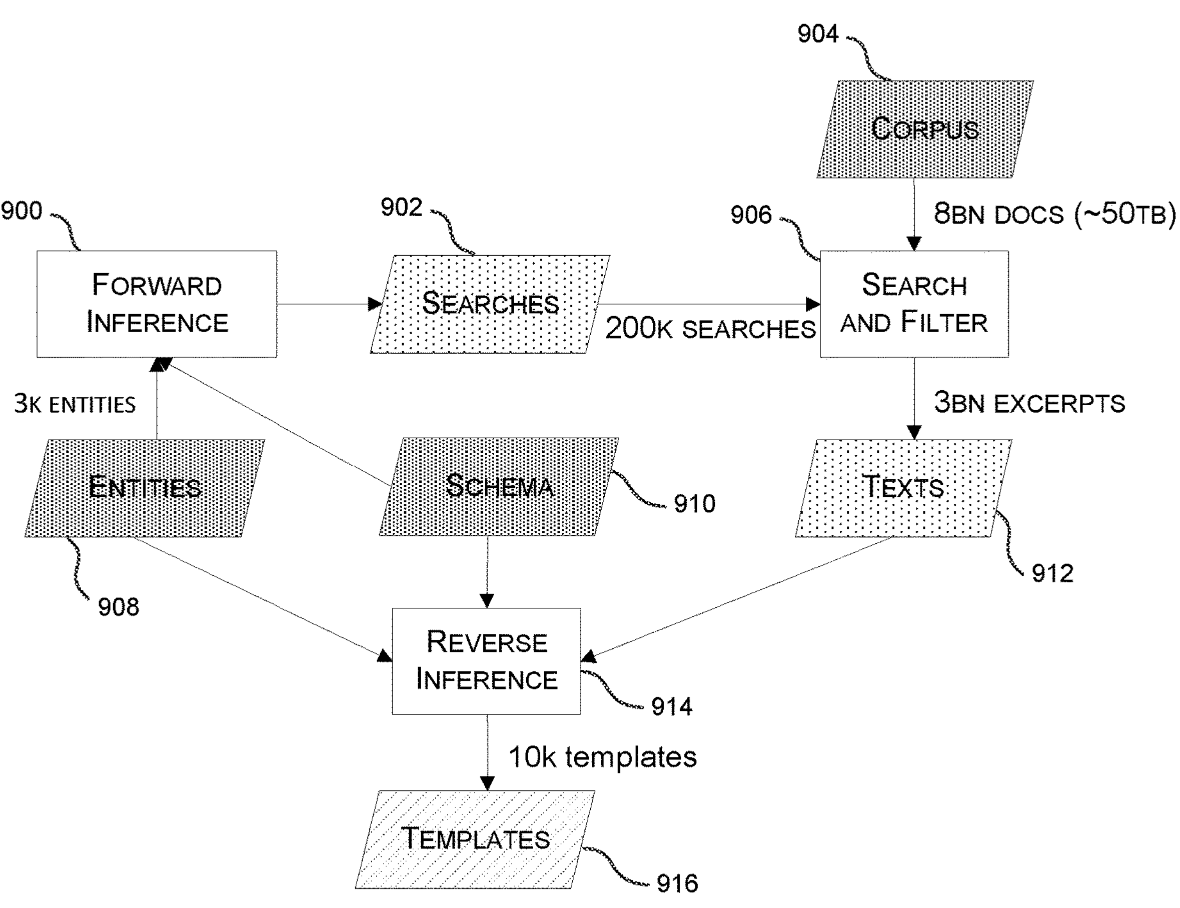
FIG. 9 is a flow diagram of another method of template learning.

To cope with billions of documents, from which to obtain text observations, inference pipelines are used and an example template learning pipeline is indicated in FIG. 9. This pipeline is also applicable in the case of observations which are not text, such as images, spreadsheets or other formatted data items.

The pipeline of FIG. 9 has a forward inference process 900, from which a probability distribution over text generated by the probabilistic generative model 104 is computed. This probability distribution is converted into a plurality of search query terms which are run as searches 902 to obtain huge numbers of text observations.

With reference to FIG. 9, the inputs to the pipeline are a corpus of documents or formatted data items 904, a plurality of entities 908 and a schema 910. The output of the pipeline is one or more templates 916. In FIG. 9 input data is shown using boxes with close dotted fill, interim data is shown in boxes with sparse dotted fill and output data is shown using boxes with diagonal line fill.

As mentioned above the forward inference process 900 results in a large number of searches which are executed on the corpus 904 and the results are filtered 906 to remove duplicates and to collapse hyper text mark up language (HTML) tags, bullets, line breaks, to simpler structure indicators. This produces a huge number, such as billions, of texts 912 which are available as observed values of the text variable in the probabilistic generative model 104.

As described above with reference to FIG. 5, in template learning observed values of the schema 910 and entity 908 variables are used and reverse inference on the probabilistic generative model 104 is carried out to infer a plurality of templates 916.

In an example of the pipeline of FIG. 9 there are around three thousand entities 908, around two hundred thousand searches, around 8 billion documents in the corpus 904, around 3 billion texts 912 and this produces around ten thousand templates. This example is given to aid understanding of the scale of the technology rather than to limit the scope of protection, since other quantities of these data items are used in many cases.

Schema learning is described with reference to FIG. 6. In schema learning the task is to learn the number of properties of a schema, the types of those properties and any parameters of the properties. Thus schema learning is made up of property learning. In schema learning, the observed variables include the text variable, the template variable and the entity variables. The process of FIG. 6 observes the text variable values in the same way as for FIG. 5 (such as using billions of documents from a web crawler or other source). The process of FIG. 6 accesses 602 a minimal set of entities each with a name and one other property, and also accesses 604 a corresponding set of templates. (Each entity type has a set of associated templates as described with reference to FIG. 2.)

Figure 6:
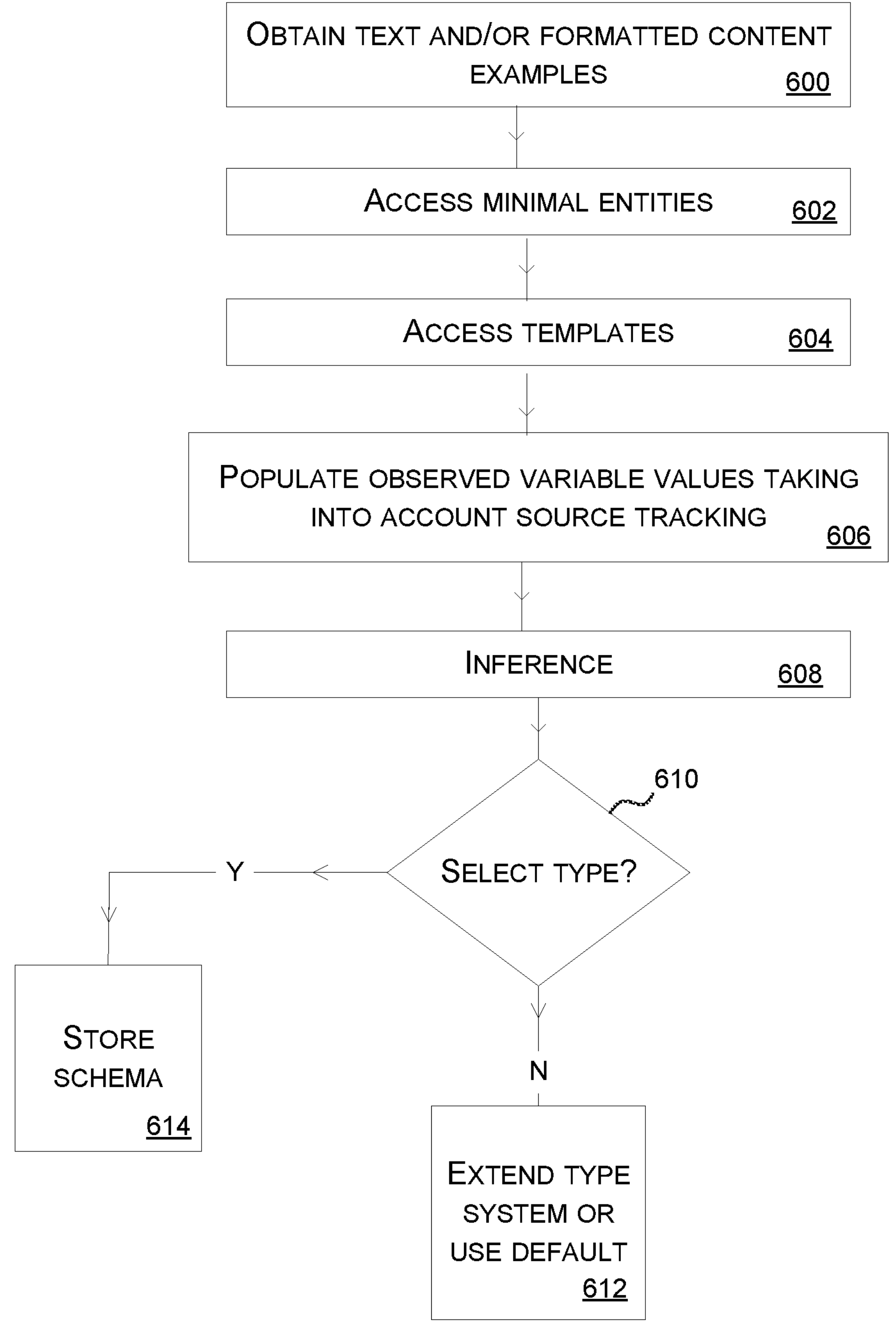
FIG. 6 is a flow diagram of a method of learning a schema.

The process of FIG. 6 populates 606 the observed variable values in the probabilistic generative model 104, optionally taking into account source tracking, in the same way as for FIG. 5. Inference 608 is carried out in the forward direction, yielding queries used for searching the document corpus. The surrounding text of each of the queries' occurrences is used as the text observation.

In an example, the inference comprises extracting string, value pairs from the text observations. String, value pairs which contain the same string are collected together. For example, where the string is "born" this gives string, value pairs such as "born, 6/7/89", "born, 1978", "born yesterday", and so on. Type inference is carried out to infer the types of the values and a distribution over the types of the values is computed according to the frequencies of the inferred types in the collected string value pairs. For example, the value 6/7/89 is inferred to be of type date, and the value "yesterday" is inferred to be of type string. A type is selected 610 from the distribution over types by selecting a most likely type which is a type with a frequency over a specified level. If no type is selected, because none of the inferred types is frequent enough, the type system is extended or a default type is used 612.

Where a type is selected at operation 610 the resulting property and its type are stored 614 in the schema being inferred. Where the type is a default one or a new one from operation 612 the type is stored in the schema.

A clustering step is optionally introduced to rationalize the properties. For example, the process of FIG. 6 may learn a separate property for each of "date of birth" and "born on". Clustering is used to identify such separate properties which are to be collapsed into a single property.

Figure 7:
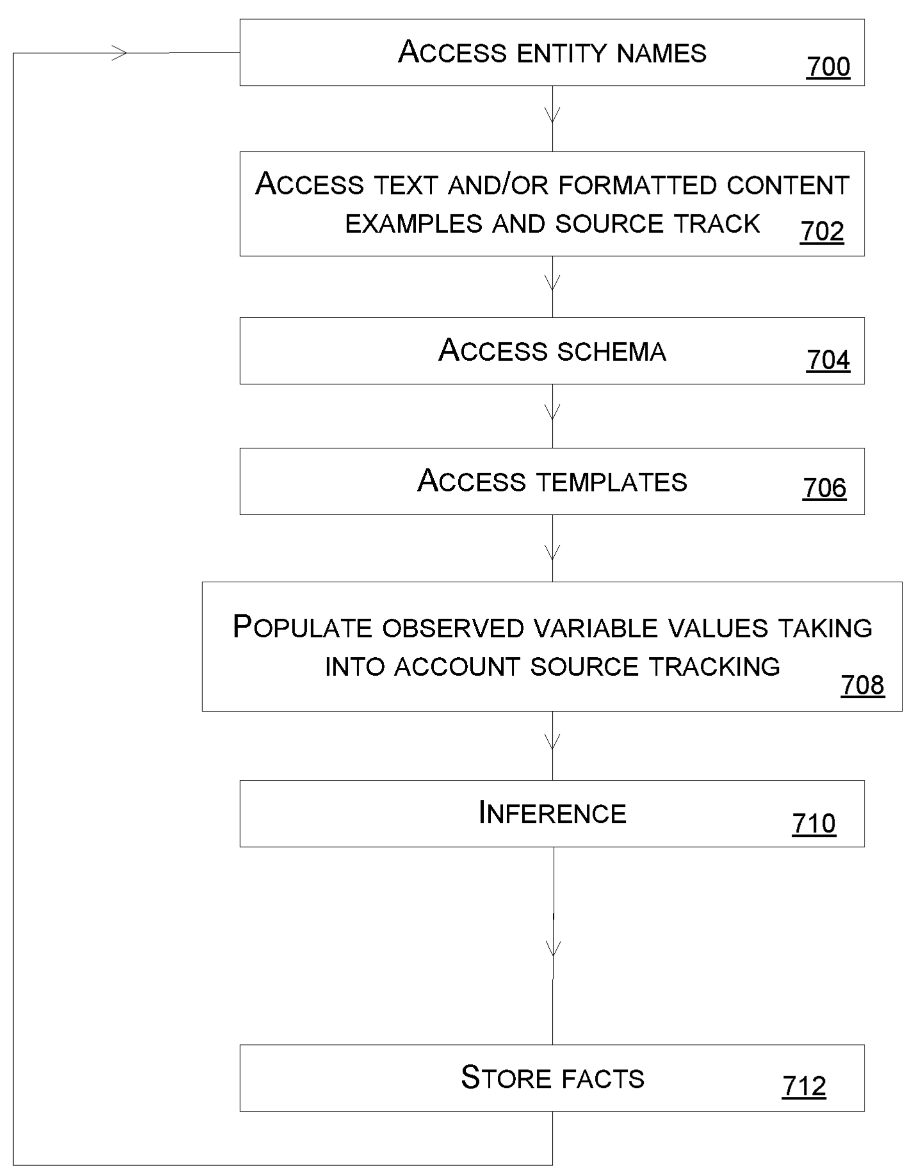
FIG. 7 is a flow diagram of a method of fact retrieval.

FIG. 7 is a flow diagram of a method of fact retrieval, also referred to as entity learning or entity inference. In this case the observed variables of the probabilistic generative model 104 include entity names, text, schema, templates; and the variables of the probabilistic generative model 104 which are inferred are the property values of entities. To observe the entity names, the process of FIG. 7 accesses 700 a plurality of entity names which are provided by an operator. The text variable is observed as described above for FIGS. 5 and 6. A schema or set of schemas is accessed 704 from a library of schemas already learnt by the knowledge base construction and/or maintenance system 102 and a template is accesses 706 from a library of templates already learnt by the system.

The observed variables are populated with values taking into account source tracking 708 as described above for FIGS. 5 and 6. Inference 710 is carried out and the entire uncertain property value (as represented by its distribution) is stored 712 in the knowledge base. The process of FIG. 7 repeats.

Figure 10:
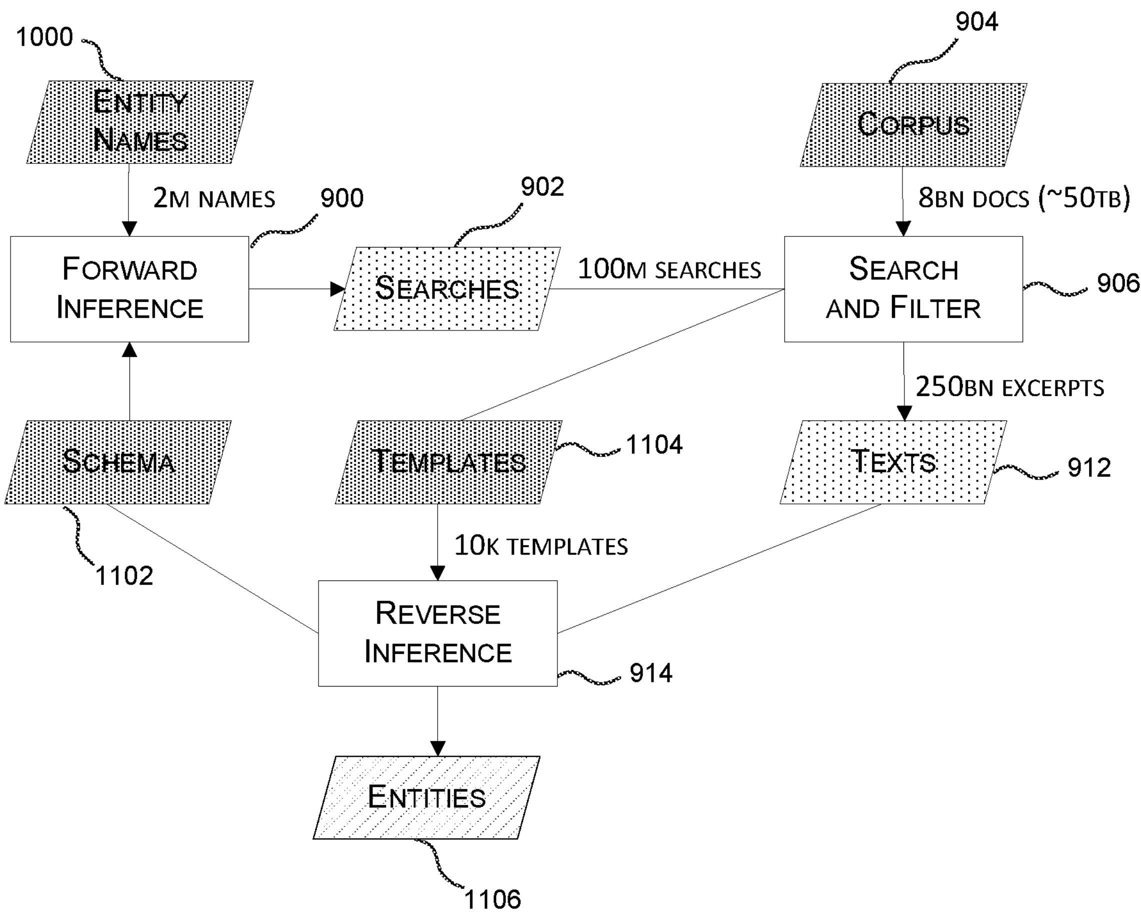
FIG. 10 is a flow diagram of another method of fact retrieval.

FIG. 10 is an example of a pipeline for fact retrieval. The inputs to the pipeline are entity names 1000, a schema 1002, templates 1004, and a corpus of documents 904. The output of the pipeline is entities 1006. In FIG. 10 input data is shown using boxes with close dotted fill, interim data is shown in boxes with sparse dotted fill and output data is shown using boxes with diagonal line fill.

Entity names are made available to the probabilistic generative model 104 and forward inference is carried out 900 to determine a plurality of query terms for searches 902 which are executed on the corpus 904. The searches look for the query terms in a format specified by different ones of the templates 1004 from the possible templates which are input to the pipeline. The search results are filtered 906 as mentioned above with reference to FIG. 9. This gives a huge number of texts 912.

Observed variables of the probabilistic generative model include the schema 1002, templates 1004 and texts 912. Reverse inference 914 yields values of the entities 1006 as described above.

In an example, the pipeline of FIG. 10 has two million entity names 1000, carries out 100 million searches, uses eight billion documents in the corpus 904, generates 250 billion texts 912 and uses ten thousand templates 1004. This example is given to aid understanding of the scale of the technology rather than to limit the scope of protection, since other quantities of these data items are used in many cases.

Figure 11:
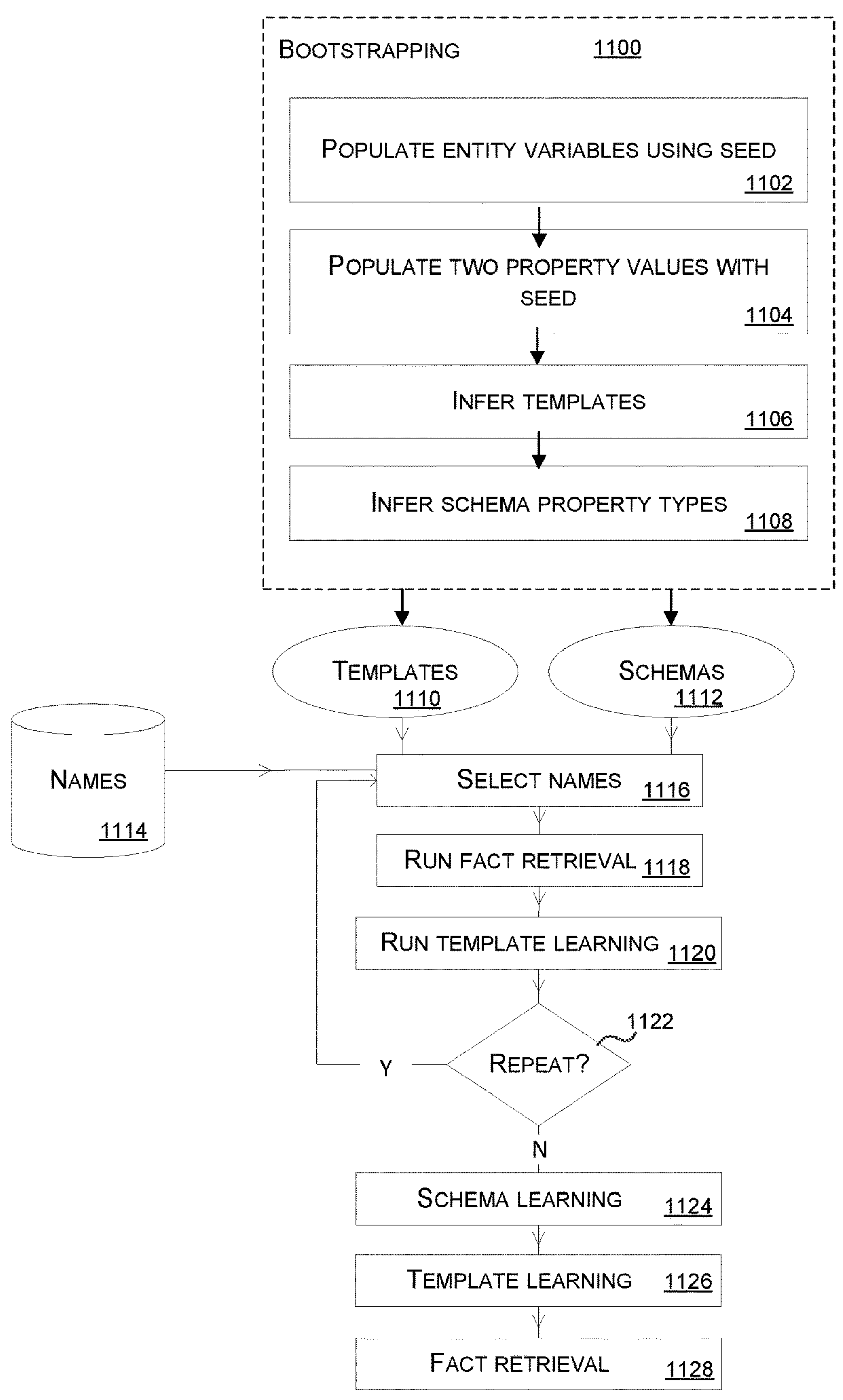
FIG. 11 is a flow diagram of a snowballing method of knowledge base construction.

FIG. 11 is a flow diagram of a snowballing method whereby the knowledge base 100 is built up, in an automated, unsupervised manner, from a very small amount of seed data. The snowballing method comprises a bootstrapping stage 1100 followed by a subsequent process. In this example, the schema for a type is inferred and high precision property values for entities of that type are learnt from web scale text data. The inference is entirely unsupervised except for one single labelled seed example used to bootstrap the system.

In a particular example, seed data comprising a single known entity (Joe Bloggs) with property values for his name and date of birth is accessed and used to populate 1102 an entity and two property values 1104 of the entity. This particular example is given to aid understanding of the technology and is not intended to limit the scope of the technology. Reverse inference is carried out to infer 1106 both templates and schema property types 1108. Thus the bootstrapping process 1100 yields a small set of 2-property templates 1110 and a corresponding schema 1112.

A set of names 1114 is made available to the process of FIG. 11 by an operator. These are names of entities. The process of FIG. 11 selects 1116 a plurality of names from the set 1114, such as ten names of entities, and runs a fact retrieval process 1118 such as the process of FIG. 7 to learn values of the two properties for the selected entities. Template learning is then executed as explained with reference to FIG. 5 using the schema 1112. This produces a plurality of templates. A check is made as to whether to repeat at check 1122 by checking whether a threshold number of templates has been learnt or whether all the names 1114 have been used. If not, the process repeats by selecting further names at operation 1116 from names 1114, running fact retrieval 1118 and running template learning 1120. When repetition stops the next stage is to execute schema learning 1124 given the entity names 1114 and templates learnt from these. Template learning is run 1126 for the most frequent properties in the new schema using the entities from the names 1114. Fact retrieval 1128 is then carried out to retrieve values for the entities from a separate test set of people's names, where the test set is provided by an operator.

The method of FIG. 11 was carried out with probAlt set to 0.0005, a mergeThreshold set to 0.99 and entityCount set to 10 million. The mergeThreshold relates to how uncertainty is collapsed in the inference algorithm to facilitate web-scale inference in some examples as described earlier in this document. For a 4000 person fact retrieval, retrieving relevant texts from 8bn documents took around 25K compute hours. Running distributed inference on these retrieved texts took a further 900 compute hours (about 2-3 hours of clock time). Fact retrieval for 2 million people involves text retrieval time of 250K compute hours, and inference time around 200K hours (the reduction in time-per-entity is due to the reduced data for rarer entities).

The table immediately below shows the top properties discovered during schema learning in a particular example which is given to aid understanding of the technology and not to limit the scope. The first column in the table shows the most common inferred name for each property (other inferred names are shown in the final column). The second column shows the most probable inferred type, out of the built-in types from the type system 110. The third column gives the number of entities where property values were found during schema learning. The rows of the table are ordered by this count, which was also used to select the 20 properties shown. This ordering focuses on properties that most people have, rather than properties present only for certain kinds of people, such as musicians or sportspeople. The fourth column gives the number of web domains that referred to the property at least once. This is an indication of how generally relevant the property is. For this table, we have excluded niche properties which are referred to by fewer than 20 domains to focus on generally relevant properties.

Using the catch-all type, the schema learning process discovers several properties whose values are not compatible with any of the built-in types. Such properties include descriptive text properties (best known for', 'biography', 'quotations'), times and time ranges ('birth time', 'years active'), and a few rarer types which may be added as new built-in types.

| Inferred name | Inferred type | Entities | Domains | Other inferred names |
|---|---|---|---|---|
| name | PersonName | 2,964 | 4,545 | birth name, real name, birthname |
| born | Date | 2,756 | 3,471 | date of birth, birthday, . . . |
| birthplace | Place | 2,583 | 1,594 | place of birth, birth place, . . . |
| occupation | Set<Hierarchy (Occupations)> | 2,569 | 801 | profession, occupations, . . . |
| nationality | Set<Hierarchy (Nationalities)> | 2,485 | 505 | citizenship |
| zodiac sign | Hierarchy(StarSigns) | 2,336 | 328 | sign, star sign, zodiac sign, . . . |
| gender | Hierarchy(Genders) | 2,110 | 247 | sex |
| spouse | Set<PersonName> | 2,058 | 665 | spouse(s), wife, husband, . . . |
| hair color | Set<Hierarchy (HairColors)> | 2,050 | 340 | hair, natural hair colour |
| height | Quantity(Length) | 2,019 | 1,060 | |
| age | Quantity(Time) | 1,807 | 62 | |
| eye color | Set<Hierarchy (EyeColors)> | 1,705 | 405 | eyes, eye colour |
| parents | Set<PersonName> | 1,678 | 513 | father, mother, father name, . . . |
| died | Date | 1,671 | 700 | date of death, death, death date |
| religion | Set<Hierarchy (Religions)> | 1,276 | 231 | |
| siblings | Set<PersonName> | 1,235 | 274 | brother, sister |
| children | Set<PersonName> | 1,121 | 368 | |
| weight | Quantity(Weight) | 594 | 325 | |
| cause of death | Hierarchy (CausesOfDeath) | 544 | 65 | |
| place of death | Place | 450 | 30 | location of death, death place |

In a particular example, with the particular entity type and particular seed described above, the knowledge base which resulted from the method of FIG. 11 was evaluated against a ground truth knowledge base. The following table gives the evaluation results for fact retrieval for the discovered properties from the table immediately above.

| Property | Prec@1 | Prec@2 | Recall | Alts |
|---|---|---|---|---|
| born | 98.2% | 99.4% | 95.3% | 1.38 |
| birthplace | 96.6% | 97.4% | 76.4% | 1.09 |
| occupation | 97.1% | 97.3% | 79.4% | 1.19 |
| nationality | 98.2% | 98.2% | 83.3% | 1.01 |
| star sign | 96.6% | 97.3% | 28.3% | 1.08 |
| gender | 99.6% | 99.6% | 38.9% | 1.00 |
| height | 98.6% | 99.2% | 79.7% | 1.10 |
| hair color | 94.4% | 94.4% | 87.8% | 1.00 |
| spouse | 95.5% | 95.5% | 44.5% | 1.03 |
| age | 98.0% | 98.0% | 37.7% | 1.03 |
| died | 98.6% | 99.2% | 95.2% | 1.32 |
| eye color | 94.7% | 94.7% | 88.4% | 1.00 |
| parents | 98.1% | 98.1% | 28.2% | 1.03 |
| religion | 97.6% | 97.6% | 57.5% | 1.00 |
| siblings | 100.0% | 100.0% | 16.4% | 1.01 |
| children | 94.3% | 94.3% | 17.2% | 1.05 |
| weight | 97.1% | 98.0% | 68.2% | 1.04 |
| cause of death | 98.4% | 98.4% | 63.4% | 1.04 |
| place of death | 97.9% | 97.9% | 47.7% | 1.00 |

The fact retrieval process can result in more than one alternative conflicting value distribution for a particular name and property. For example, a date of birth property may have two retrieved alternatives, such as 5 May 1976 and 5 May 1977. Alternatives are ordered by the number of observations, such as web pages, that support them (which can be in the hundreds or thousands). The metric 'precision@1' refers to the percentage of retrieved values where the first alternative was correct, that is, the alternative with the most supporting web pages. The metric 'precision@2' gives the percentage of retrieved values where the first or second alternatives were evaluated as correct. Recall is defined as the percentage of entities with ground truth values where a prediction was made. The table above also includes the average number of alternatives ('Alts'), again where a prediction was made.

The results in the above table were achieved without using any ground truth values, apart from a single date of birth value. Overall, the precisions of the first alternative (Prec@1) are high, with 13 of the 19 are in the 97%+ range and 9 of these above 98%. The lowest precisions are for children and hair and eye color properties, although these are still above 94%. Looking at the average number of alternatives, it is seen that most properties have just one alternative for the majority of predictions, so the precision@2 is the same as the precision@1. Exceptions to this include date of birth and date of death, which have 30-40% predictions with two alternatives (e.g. due to off-by-one errors). Considering the second alternative increases the precision of these properties by about 1%, bringing them to over 99% precision. The recall of the properties varies widely, from 16.4% for siblings through to 95.3% for date of birth, with an average of 59.7%. Some of this variation is due to the maximum possible recall varying, that is, the variation in the fraction of values actually available on the web. Another factor is how well a set of templates captures how such values are expressed in text. For example, dates of birth and death are often expressed in a standard form, whereas there is more variation in how siblings and children are described.

Various embodiments are now described in which the probabilistic generative model 104 is extended and these include the property list model, the page model and the value noise model. Zero, one or more of these extensions are used in the probabilistic generative model 104.

In some embodiments the probabilistic generative model comprises a property list model. The property list model allows the knowledge base (KB) construction and/or maintenance system to parse lists of property values rather than only values expressed in unstructured text. Each element in the list is assumed to refer to the name of the property as well as its value; a new kind of template, called a property list template, is used to represent such (name, value) pairs. This kind of template allows property names to be learned during schema learning.

In some examples the probabilistic generative model comprises a page model. The page model enables the knowledge base construction and/or maintenance system to associate together text extracts from the same hyper text mark up language (HTML) page or property list more strongly. Specifically it assumes that the number of entities referred to on a single page is much smaller than the total number of entities referred to in the entire web. To encode this assumption in a probabilistic program, a subset of all entities are first selected as entities on the page. All text extracts on the page then only refer to these entities.

In some examples the probabilistic generative model comprises a value noise model. The value noise model allows property values to vary slightly from one page to another while still being considered the same value. This model adds type-specific noise to a property value just before it is converted into text and written on the page.

Modelling noise is particularly useful for numeric quantities, like height, where the same person may have slightly different values reported on different pages. With this noise model in place, two pages reporting slightly different values are considered more likely to be referring to the same underlying entity, rather than less. It would also be possible to allow other kinds of noise for types other than Quantity. For example, for a Date type noise is modelled to allow for mistakenly swapping the day and month in a date value.

An example probabilistic program is now given demonstrating the property list model, the page model and the value noise model.

```
// Pick a subset of entities for this page
var pageEnts=random Subset(entities,numOnPage);
// Generate a set of texts within the page
for(int j=0;j<texts.Length;j++) {
  // Pick an entity to talk about
  var entity=random Uniform(pageEnts);
  // Pick a property index
  int i=random Uniform(props.Length);
  // Pick a format from type-specific prior
  var format=random props[i].Type.FormatPrior;
  // Pick an alternative value to use
  var alt=random Uniform(entity[i]);
  // Add type-specific noise
  var noisyVal=props[i].Type.AddNoise(alt);
  // Use format to convert value into string
  var str=noisyVal.ToString(format);
  // Pick a property list template e.g. "|{propName}: {propValue}|"
  string t=random Uniform(listTemplates);
  // Fill in the property name and value
  texts[j]=string.Format(t,props[i].Name,str);
```

Further information about the built in types of the type system 110 is now given.

Object Types (Date, PersonName)

The Date and PersonName types are both object types. An object type represents compound values of one or more types. Object types have no type parameters and so there is one instance of each object type. Object types have their own properties, for example the Date type has properties Day, Month and Year. For an object type, the prior over values is the product of hand-specified priors over individual properties. The ToString( ) method for object types requires that a set of format parts are manually specified. For Date these include: the date and month in numeric form with and without a leading zero (d,dd,M,MM); the short and long month names (MMM,MMMM), and the numeric year (yyyy). For people's names the format parts include first, middle and last names, nickname, initials, prefix and suffix. Given the format parts, the ToString( ) method for an object type is shown in the example program immediately below. This method uses GetParts( ) to compute string values for each format part from a value of the type—for example, computing the long and short month names from the month value. Each object type implements GetParts( ) using an appropriate probabilistic program. The format prior is a uniform distribution over a manually specified set of valid formats, such as "dd MMMM yyyy".

```
string ToString(object value, string format) {
  // Get strings for each format part
  // from the value objects
  string[ ] partStrs=GetParts(value);
  // Insert part strings into format string
  // such as "{dd} {MMMM} {yyyy}"
  return string.Format(format, partStrs);
}
```

Hierarchy Type.

Figure 8:
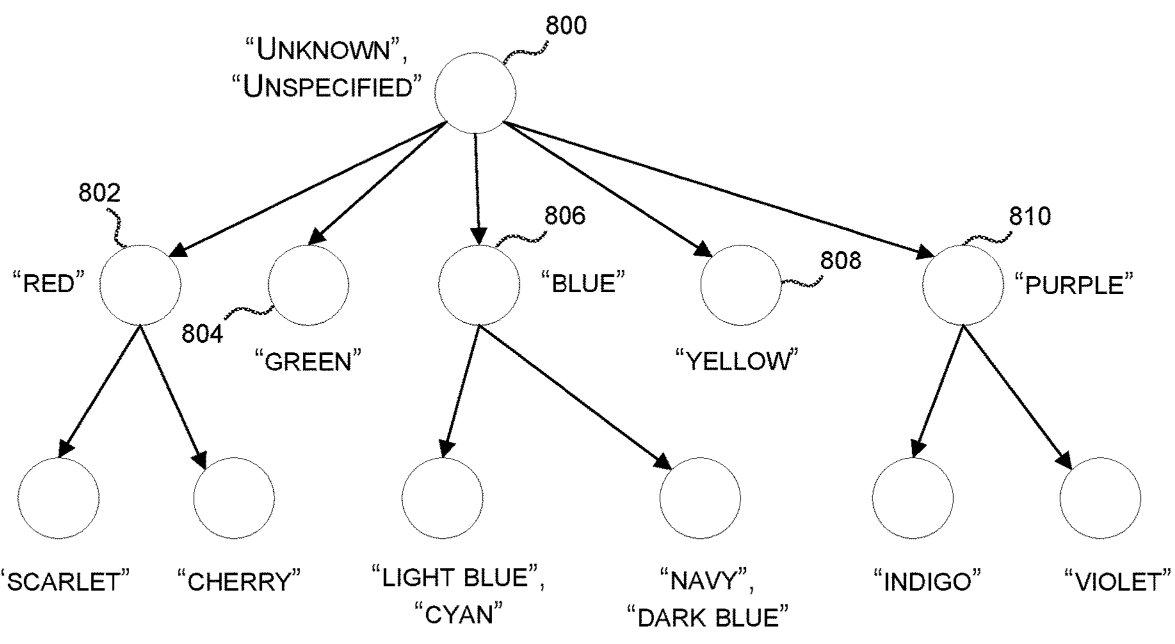
FIG. 8 is a schematic diagram of a hierarchy used in a hierarchy type.

A Hierarchy type is used for properties that take one of a set of values. These values can be referred to with varying specificity through the use of a hierarchy, like the example in FIG. 8. The leaf nodes of the hierarchy are the values of the type, such as "light blue", "yellow". Nodes higher in the hierarchy (802-810) allow for values to be referred to less precisely, such as "blue" vs "light blue". The Hierarchy type takes one type parameter which is the hierarchy itself. In the example described with reference to FIG. 11, a set of 61 hierarchies are provided by an operator and the type prior is a uniform distribution over these known hierarchies. As shown in FIG. 8, each node in the hierarchy has one or more strings associated with it. These strings are synonyms for that node value in natural language. A particular string can be associated with multiple nodes in a hierarchy, which allows ambiguous terms to be treated with appropriate uncertainty when the probabilistic program is inverted. The ToString( ) method for the Hierarchy type converts a value (leaf node) into a string according to a depth specified by the format as shown in the example program immediately below. Using this method, the "cyan" leaf node can also appear in text as "light blue", "blue", "unknown" or "unspecified". Each leaf node also has a prior probability—these are included in the type parameters and so learned as part of schema learning. The format prior for the Hierarchy type is uniform over formats of the form {CaseFormat}{Depth} where CaseFormat is one of Default, Upper, Lower, Capitalized, FirstCapitalized, and Depth is the depth in the hierarchy. The Default subformat uses the casing of the string value in the hierarchy, whereas the other case subformats convert to the specified case. The Place type is a subtype of the Hierarchy type with a modified ToString( ) method. This modified method first selects one or more nodes along the path from the leaf node value to the root 800. Each node is then written out in the form of a list such as "Chelsea, London, England".

```
string ToString(Node value, string format) {
  // Get depth e.g. "{Depth0}" gives 0.
  int depth=GetDepthFromFormat(format);
  // Get ancestor at that depth
  Node ancestor=value.GetAncestorAt(depth);
  // Pick one of the texts at this node
  return random Uniform(ancestor.Texts);
}
```

Quantity Type.

A Quantity type is used for values that represents quantities such as lengths, weights and so on. The main type parameter determines which kind of quantity it is, out of a pre-defined set, for example: {Length, Time, Weight}. Each kind of quantity has a set of units. Each unit has a conversion factor, a set of unit names (such as "m", "metre", "meter" etc.) and an optional sub-unit used for writing multi-unit quantities like "1 m 58 cm". The prior over values is Gaussian with type parameters for the mean and variance, along with a binary flag indicating if the prior is for the value or the logarithm of the value. The process of converting Quantity values to strings handles both unit conversion and sub-units. This results in the more complex ToString( ) method of the following example probabilistic program.

```
string ToString(Quantity value, string format)
{
  // Get unit from the format, such as
  // "{m:F2}m" or "{feet:F0}'{sub_inch:F0
  " Unit unit=GetUnit(format,out unitFormat);
  // Get subunit from format (if any)
  Unit sub =GetSubUnit(format,out subFormat);
  // Convert value into the target unit
  double d=value.InUnit(unit);
  // Format numeric value into a string
  string unitStr=d.ToString(unitFormat);
  if (sub==null) {
    return string.Format(format, unitStr);
  }
  // Sub-unit conversion
  double d2=Math.Frac(d)*sub.NumberIn(unit);
  // Value in sub-unit as string string
  subStr=d2.ToString(subFormat);
  return string.Format(format,unitStr,subStr);
}
```

This method first extracts the unit and subunit and their individual numeric formats from the format string. The provided value is converted into the target unit using InUnit ( ) and then into a string. If there is a sub-unit in the format, then the fractional part of the value is converted into the subunit using NumberIn( ) and again into a string. Finally, the value strings are inserted into the format string to give the returned result. The format prior for a Quantity type is uniform over a set of format strings derived from the quantity's unit and subunit names.

The sets of units used are manually provided to the system. However, the system learns different names for each unit from web text using a variant of the model where the unit names in the ToString( ) are replaced by random variables.

Set Type.

The Set<T> type is used to represent sets of values of the above types. The primary type parameter is T which is the type of the elements in the set. The type prior over this element type is a uniform mixture of the type priors for all of the above types. An additional type parameter is the expected size of the set, used to define a Poisson distribution over the set size in the prior over values. A value of a Set<T> type consists of a set of element values, each with a 'renown' probability representing how well-known the element value is for the entity. For example, a person may be well-known as a writer, but less well-known as a poet. A further two type parameters define the Beta distribution used as a prior over the renown probabilities. The ToString( ) method, shown immediately below, first creates a sample of elements from the set, using each element's associated renown probability.

```
string ToString(Set<Elem<T>> set,string format)
{
  // Sample elements to mention
  var vals=new List<T>( );
  foreach(Elem<T> el in set) {
    bool mention = random Bernoulli(el.Prob);
    if (mention) vals.Add(el.Value);
  }
vals.Permute( ); // Permute order of values
// With probability 0.5, keep only one value
if (random Bernoulli(0.5)) vals=vals.Take(1);
// Get placeholder count for format
// e.g. "{0}, {1} and {2}" gives 3.
int count=GetPlaceholderCount(format);
// Constrain the format to match the sample
constrain(count==vals.Count);
// Convert values to strings & embed in format
var strs=vals.Select(el=>el.ToString());
return string.Format(format);
}
```

These are the elements of the set that the author of the text knows about. The author then chooses (with equal probability) whether to mention all of these elements or just one element. The placeholder count in the format is then constrained to match the number of mentioned elements. Finally, the mentioned elements are converted into string values and inserted into the format string. The prior over formats for the Set<T> type allows multiple elements connected by suitable separators such as comma, "and" and so on—for example "{0}, {1} and {2}". Explicitly modelling the cardinality of the set can be very helpful. For example, suppose two web pages both refer to Alan Smith but mention different pairs of parents. Knowing that people have two parents means that we can assume that these are two different Alan Smiths. Conversely, if the two pages mentioned different pairs of professions, say "actor, film director" and "comedian, screenwriter", it is still possible that they both refer to the same person, as people can have more than two professions.

The table below gives some illustrative examples from the many thousands of templates learned as part of the method of FIG. 11. Some of these templates contain special characters which represent document structure collapsed from the original HTML; the meaning of these structure characters is given in the structure key. In addition, the table below includes some examples of nested templates, where one template is a substring of another. Such nested templates are treated as separate by the model which has the advantage that they can be assigned different template probabilities. Longer templates are generally less confusable with other similar templates, which leads to lower uncertainty in the template variable during inference.

| Text templates | Structure key: |
|---|---|
| {age}-old {name} | ⏏ Break |
| {name}'s sister {siblings} | ❖ Section |
| {name} was born in {place_of_birth}. Her mother, {parents} | ● Bullet |
| | ▌ Vertical separator |
| {name} stands {height} tall and weighs {weight} | ‖ Header separator |
| {name} died from {cause_of_death} in {date_of_death} | ▬ Horizontal separator |
| {occupations} {name} ({date_of_birth} | These three templates are nested-shorter ones are substrings of longer ones. |
| {occupations} {name} ({date_of_birth}-{date_of_death} | |
| {nationalities} {occupations} {name} ({date_of_birth}-{date_of_death} | |

-continued

| Text templates with document structure |
| --- |
| {name}▄ Famous As: ▌{occupations}▄Date of Birth: ▌{date_of_birth}▄Place of Birth: ▌{place_of_birth}▄Height: ▌{height} |
| {name} ● Born*>{date_of_birth} ● Birthplace ❖ {place_of_birth} ● Spouse ❖ {spouses} |
| **Property list templates** |
| Born: {date_of_birth} Birthplace: {place_of_birth}. Gender: {gender} Religion: {religion} |
| Died: {date_of_death}, in {place_of_death} |
| Kids: {children} |

Figure 12:
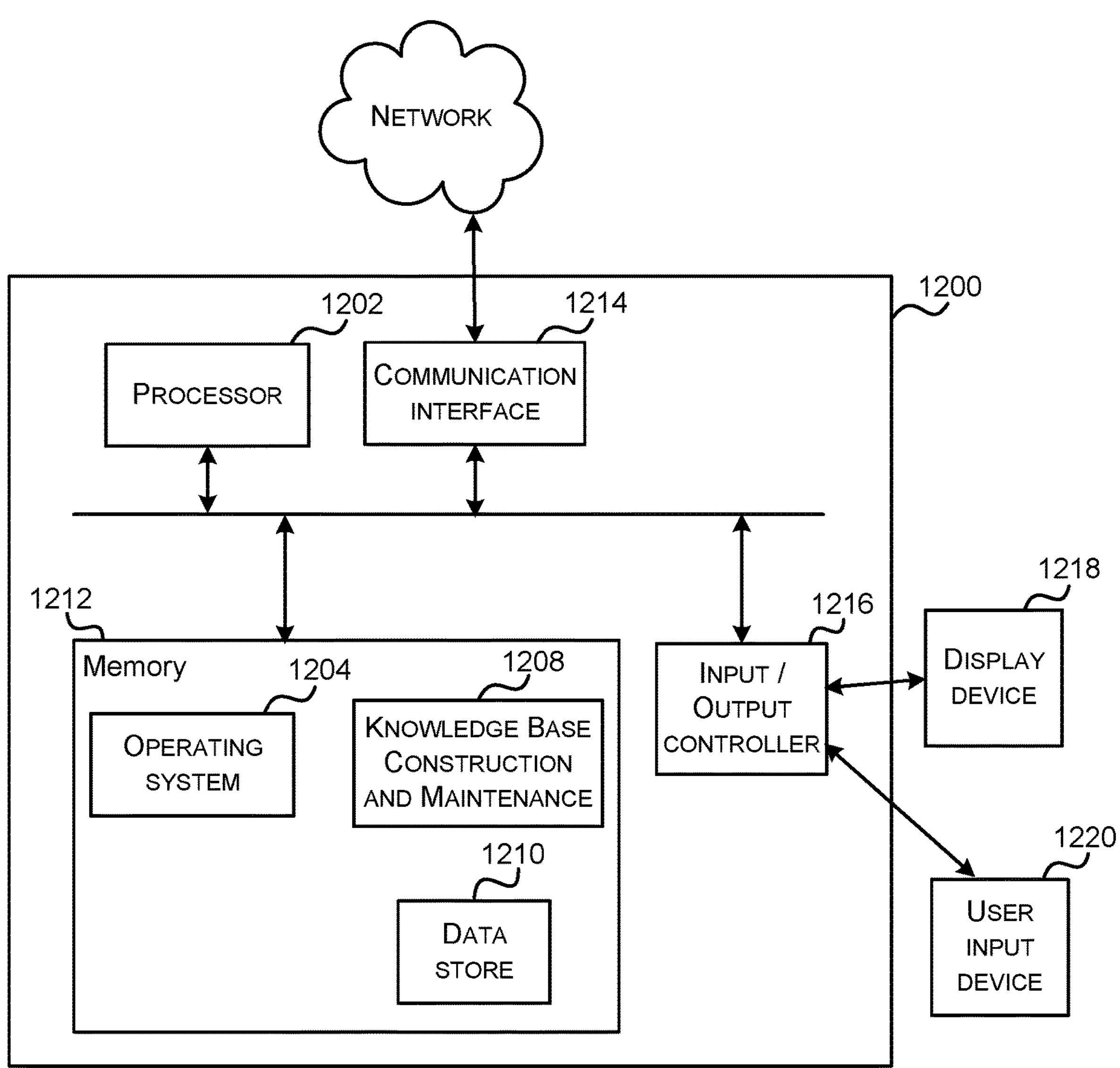
FIG. 12 illustrates an exemplary computing-based device in which embodiments of a knowledge base construction system are implemented.

FIG. 12 illustrates various components of an exemplary computing-based device 1200 which are implemented as any form of a computing and/or electronic device, and in which embodiments of a knowledge base construction and/or maintenance system, or part of a distributed knowledge base construction and/or maintenance system are implemented in some examples.

Computing-based device 1200 comprises one or more processors 1202 which are microprocessors, controllers or any other suitable type of processors for processing computer executable instructions to control the operation of the device in order to construct and/or maintain a probabilistic knowledge base. In some examples, for example where a system on a chip architecture is used, the processors 1202 include one or more fixed function blocks (also referred to as accelerators) which implement a part of the method of any of FIGS. 4 to 7 and 11 in hardware (rather than software or firmware). Platform software comprising an operating system 1204 or any other suitable platform software is provided at the computing-based device to enable application software including knowledge base construction and maintenance system 1208 (or part of knowledge base construction and maintenance system 1208 in case of a distributed implementation) to be executed on the device.

The computer executable instructions are provided using any computer-readable media that is accessible by computing based device 1200. Computer-readable media includes, for example, computer storage media such as memory 1212 and communications media. Computer storage media, such as memory 1212, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1212) is shown within the computing-based device 1200 it will be appreciated that the storage is, in some examples, distributed or located remotely and accessed via a network or other communication link (e.g. using communication interface 1214).

The computing-based device 1200 also comprises an input/output controller 1216 arranged to output display information to a display device 1218 which may be separate from or integral to the computing-based device 1200. The display information may provide a graphical user interface such as to display inference results, probability distributions, variable values and other data. The input/output controller 1216 is also arranged to receive and process input from one or more devices, such as a user input device 1220 (e.g. a mouse, keyboard, camera, microphone or other sensor). In some examples the user input device 1220 detects voice input, user gestures or other user actions and provides a natural user interface (NUI). This user input may be used to specify whether source tracking is to be used and in what way source tracking is to be used, to view inference results, to set parameter values and for other purposes. In an embodiment the display device 1218 also acts as the user input device 1220 if it is a touch sensitive display device. The input/output controller 1216 outputs data to devices other than the display device in some examples, e.g. a locally connected printing device.

Alternatively or in addition to the other examples described herein, examples include any combination of the following:

A knowledge base construction and/or maintenance system for use with a probabilistic knowledge base comprising:

- a probabilistic generative model comprising a process for generating text or other formatted data from the knowledge base; and
- an inference component configured to generate inference results, by carrying out inference using inference algorithms, run on the probabilistic generative model, in either a forward direction whereby text or other formatted data is generated, or a reverse direction whereby text or other formatted data is observed and at least one unobserved variable of the probabilistic generative model is inferred; and
- wherein the inference component is configured to update the knowledge base using at least some of the inference results.

The knowledge base construction and/or maintenance system described above wherein the probabilistic knowledge base comprises at least one entity type, each entity type having one or more entities; and wherein the probabilistic generative model comprises for each entity type, an associated schema comprising a plurality of property types, each property type comprising one or more formats to convert a property value to a formatted property value which is at least part of an instance of the text or other formatted data.

The knowledge base construction and/or maintenance system described above wherein the probabilistic generative model comprises one or more templates that combine the formatted property values into text or other formatted data.

The knowledge base construction and/or maintenance system described above wherein the probabilistic generative model comprises a process linking, for a given entity type of the knowledge base, a schema of the entity type with instances of the entity type, templates and text or formatted data referring to the instances of the entity type; and where the process has one or more probability distributions representing uncertainty of any one or more of the instances of the entity type, schemas, templates and text or formatted data referring to the instances of the entity type.

The knowledge base construction and/or maintenance system described above comprising a source tracker configured to determine source tracking information of the observed text or other formatted data, the source tracking information comprising, for individual observations from the observed text or other formatted data, any one or more of: an identifier of a source of the observation, security information of the observation, privacy information of the observation.

The knowledge base construction and/or maintenance system described above wherein the source tracker is configured to track an influence of the individual observations on unobserved or observed variables of the probabilistic generative model.

The knowledge base construction and/or maintenance system described above having user settings functionality comprising one or more source tracking rules, thresholds or criteria set according to the user settings, and whereby the inference component takes into account the source tracking rules, thresholds or criteria when observing at least one variable of the probabilistic model and/or inferring at least one variable of the probabilistic model.

The knowledge base construction and/or maintenance system described above wherein the source tracker is configured to store the source tracking information in the knowledge base such that other applications are able to retrieve the source tracking information by querying the knowledge base.

The knowledge base construction and/or maintenance system described above comprising a type system comprising a library of built-in property types, where a property is a characteristic of an entity type of the knowledge base, and wherein each property type has one or more formats to convert a property value to a formatted property value, and wherein the property types are parameterized.

The knowledge base construction and/or maintenance system described above wherein the probabilistic generative model comprises probability distributions representing belief about the type of one or more properties of entities of the knowledge base, and wherein the probability distributions are updated during the forward or reverse inference.

The knowledge base construction and/or maintenance system described above wherein the library of property types comprises at least one of: a set type representing a plurality of values of the same type, a quantity type having a parameter determining a kind of quantity, a code type specifying a type of a regular expression, an object type representing compound values of one or more types.

The knowledge base construction and/or maintenance system described above wherein the probabilistic generative model comprises at least one of: a property list model comprising a property list template representing name, value pairs; a page model comprising an encoding of the following assumption in the probabilistic generative model: the number of entities referred to on a single page is smaller than the total number of entities referred to in a corpus of pages; a value noise model comprising a process which adds type-specific noise to a property value.

A computer-implemented method at a knowledge base construction and/or maintenance system comprising:

- storing, at a memory, a probabilistic generative model comprising a process for generating text or other formatted data from a probabilistic knowledge base;
- generating inference results for updating the knowledge base, by carrying out inference using inference algorithms run on the probabilistic generative model, in either a forward direction whereby text or other formatted data is generated, or a reverse direction whereby text or other formatted data is observed and at least one unobserved variable of the probabilistic generative model is inferred; and
- updating the knowledge base using at least some of the inference results.

The method described above comprising learning a schema of an entity type of the knowledge base, the schema comprising a plurality of property types where a property is a characteristic of an entity taking a value, and wherein learning the schema comprises carrying out the inference in the reverse direction to update one or more probability distributions related to the schema.

The method described above comprising learning facts comprising values of properties of entities of the knowledge base, by observing variables of the probabilistic generative model which relate to the generated text or other formatted data, and carrying out the inference in the reverse direction to update one or more probability distributions related to properties of the entities.

The method described above comprising learning templates, by observing variables of the probabilistic generative model which relate to the generated text or other formatted data, and carrying out the inference in the reverse direction to update one or more probability distributions related to the templates.

The method described above wherein the knowledge base initially comprises at least one seed example of an entity with at least two property values, and the method comprises bootstrapping construction of a schema and a plurality of templates by carrying of inference in the reverse direction over the probabilistic generative model.

The method described above further comprising, iteratively carrying out fact retrieval and template learning using a plurality of names of entities, where fact retrieval comprises inferring values of properties of the entities of the knowledge base given at least observations of text or other formatted data.

The method described above further comprising, when the plurality of names of entities has been used, carrying out schema learning followed by template learning and followed by fact retrieval; wherein schema learning comprises inferring values of types of properties of an entity given at least observations of text or other formatted data.

A method of constructing a knowledge base comprising information about a plurality of entities, the method comprising:

- accessing, at a processor, a process for generating text or other formatted data from the knowledge base, the process linking, for a given entity type, instances of the entity type, schemas and templates;

the process having one or more probability distributions representing uncertainty of any one or more of the instances of the entity type, schemas and templates;

receiving, at the processor, at least one example of text or other formatted data compatible with the process;

updating the one or more probability distributions by carrying out inference using the at least one example; and adding any of: a schema, entity instance, template, to the knowledge base using information about the updated probability distributions.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A knowledge base construction system for updating a probabilistic knowledge base with a probabilistic generative model, the system comprising:

a processor; and a memory storing the probabilistic generative model, an inference component, and a source tracker, the probabilistic knowledge base storing prior probability distributions of variables of the probabilistic generative model, the prior probability distributions representing likelihoods of particular values of the variables, and the inference component comprising computer executable instructions that upon execution by the processor:

generate inference results using an inference algorithm that executes on the probabilistic generative model with unlabeled training data as input to the inference algorithm:

in a forward direction resulting in observed formatted data and a posterior distribution being generated, the posterior distribution representing a likelihood of possible inference results across a document corpus given a particular query, being approximated by applying heuristics, and converted into a plurality of search queries executed across the document corpus resulting in an observed variable of the probabilistic generative model being populated, and in a reverse direction whereby the formatted data is observed and an unobserved variable of the probabilistic generative model is inferred; and update the prior probability distributions stored in the probabilistic knowledge base using a portion of the inference results, and the source tracker configured to determine source tracking information of the observed formatted data, the source tracking information comprising, for individual observations from the observed formatted data, security information of the observation, wherein the source tracker is configured to store the source tracking information in the probabilistic knowledge base such that other applications are able to retrieve the source tracking information by querying the probabilistic knowledge base, wherein the source tracker is configured to determine that an inferred fact has a single restricted source based on the source tracking information, and apply the same restriction to a query to the probabilistic knowledge base retrieving that inferred fact based on the determining.

2. The knowledge base construction system of claim 1, wherein the probabilistic knowledge base comprises an entity type having an entity, wherein the probabilistic generative model comprises a schema comprising a property type for the entity type, the property type comprising a format to convert a property value to a formatted property value.

3. The knowledge base construction system of claim 2 wherein the formatted property value is part of an instance of the formatted data, wherein the probabilistic generative model comprises a template that combines the formatted property value into the formatted data.

4. The knowledge base construction system of claim 3 wherein the template is selected based on template learning, wherein a template variable is inferred in template learning and another variable of the probabilistic generative model is observed.

5. The knowledge base construction system of claim 1 wherein the source tracker is configured to store, for the individual observations from the observed formatted data, conflicting values of the source tracking information.

6. The knowledge base construction system of claim 5 wherein the source tracker is configured to track an influence of the individual observations on unobserved or observed variables of the probabilistic generative model.

7. The knowledge base construction system of claim 5 having user settings comprising source tracking rules, thresholds or criteria set according to the user settings, and whereby the inference component takes into account the source tracking rules, thresholds or criteria when observing a variable of the probabilistic generative model and/or inferring the variable of the probabilistic generative model.

8. The knowledge base construction system of claim 5 comprising a type system comprising a library of built-in property types, where a property is a characteristic of an entity type of the probabilistic knowledge base, and wherein each built-in property type has a format to convert a property value to a formatted property value, and wherein the built-in property types are parameterized.

9. The knowledge base construction system of claim 8 wherein the probabilistic generative model comprises probability distributions representing belief about the type of one or more properties of entities of the probabilistic knowledge base, and wherein the probability distributions are updated during the forward and the reverse directions.

10. The knowledge base construction system of claim 8 wherein the library of property types comprises one or more of: a set type representing a plurality of values of the same type, a quantity type having a parameter determining a kind of quantity, a code type specifying a type of a regular expression, and an object type representing compound values of one or more types.

11. The knowledge base construction system of claim 1, wherein the probabilistic generative model comprises a process linking, for a given entity type of the probabilistic knowledge base, a schema of the given entity type with an instance of the given entity type, a template, and formatted data referring to the instance of the given entity type; and wherein the process has a probability distribution representing uncertainty of the instance of the given entity type, schema, template, and formatted data referring to the instance of the given entity type.

12. The knowledge base construction system of claim 1 wherein the probabilistic generative model comprises one or more of a property list model, a page model, and a value noise model, the property list model comprising a property list template representing name and value pairs, the page model comprising an encoding of an assumption in the probabilistic generative model that the number of entities referred to on a single page is smaller than the total number of entities referred to in a corpus of pages, the value noise model comprising a process which adds type-specific noise to a property value.

13. A computer-implemented method for updating a probabilistic knowledge base, the method comprising:

storing, at a memory, a probabilistic generative model, the probabilistic knowledge base storing prior probabilistic distributions of variables of the probabilistic generative model, the prior probabilistic distributions representing likelihoods of particular values of the variables;

generating inference results using an inference algorithm that executes on the probabilistic generative model with unlabeled training data as input to the inference algorithm:

in a forward direction resulting in observed formatted data and a posterior distribution being generated, the posterior distribution representing a likelihood of possible inference results across a document corpus given a particular query, being approximated by applying heuristics and converted into a plurality of search queries executed across the document corpus resulting in an observed variable of the probabilistic generative model being populated, and in a reverse direction whereby the formatted data is observed and an unobserved variable of the probabilistic generative model is inferred;

updating the prior probability distributions stored in the probabilistic knowledge base using a portion of the inference results;

determining source tracking information of the observed formatted data, the source tracking information comprising, for individual observations from the observed formatted data, security information of the observation;

storing the source tracking information in the probabilistic knowledge base such that other applications are able to retrieve the source tracking information by querying the probabilistic knowledge base; and determining that an inferred fact has a single restricted source based on the source tracking information, and apply the same restriction to a query to the probabilistic knowledge base retrieving that inferred fact based on the determining.

14. The method of claim 13 wherein for individual observations from the observed formatted data, storing the source tracking information includes storing conflicting values of source tracking information.

15. The method of claim 14 comprising learning facts comprising values of properties of entities of the probabilistic knowledge base, by observing variables of the probabilistic generative model which relate to the observed formatted data, and carrying out the inference in the reverse direction to update a probability distribution related to properties of the entities, wherein the source tracking information comprises, for individual observations from the observed formatted data, privacy information of the observation.

16. The method of claim 14 comprising learning templates, by observing variables of the probabilistic generative model which relate to the observed formatted data, and carrying out the inference in the reverse direction to update a probability distribution related to the templates, wherein, the source tracking information comprises, for individual observations from the observed formatted data an identifier of a source of the observation.

17. The method of claim 14, wherein, the source tracking information comprises, for individual observations from the observed formatted data, security information of the observation, and wherein the probabilistic knowledge base initially comprises a seed example of an entity with at least two property values, and the method comprises bootstrapping construction of a schema and a plurality of templates by carrying of inference in the reverse direction over the probabilistic generative model.

18. The method of claim 17 further comprising:

iteratively carrying out fact retrieval and template learning using a plurality of names of entities, wherein fact retrieval comprises inferring values of properties of the entities of the probabilistic knowledge base given at least observations of the observed formatted data; and generating a first alternative conflicting value distribution and a second alternative conflicting value distribution for a particular entity name and property, wherein the first alternative conflicting value distribution comprises a first alternative with the most number of observations in the observed formatted data, and wherein the second alternative comprises, if present, a second alternative with the second most number of observations in the observed formatted data, otherwise the second alternative equaling the first alternative.

19. The method of claim 18 wherein a search engine or a conversational assistant:

receives a query from a user computing device, retrieves knowledge about the unobserved variable from the updated prior probability distributions stored in the probabilistic knowledge base in response to the query, includes the retrieved knowledge about the unobserved variable in a response, and transmits the response to the user computing device.

* * * * *